United States Patent [19]

Sato et al.

[11] Patent Number: 5,274,612
[45] Date of Patent: Dec. 28, 1993

[54] INFORMATION PROCESSOR AND DISK MEMORY USED IN THE SAME

[75] Inventors: Yoshio Sato, Hitachi; Nobuyoshi Tsuboi, Naka; Hiroyuki Minemura, Hitachi; Hisashi Andoh, Hitachi; Masaichi Nagai, Hitachi; Isao Ikuta, Iwaki; Yoshimi Kato, Takahagi; Yoshihito Maeda, Mito; Tatsuya Sugita, Hitachi; Yutaka Sugita, Tokorozawa, all of Japan

[73] Assignee: Hitachi, Ltd., Tokyo, Japan

[21] Appl. No.: 742,491

[22] Filed: Aug. 5, 1991

Related U.S. Application Data

[63] Continuation-in-part of Ser. No. 584,079, Sep. 18, 1990, abandoned.

[30] Foreign Application Priority Data

Sep. 27, 1989 [JP] Japan .................................. 1-249154
Dec. 6, 1989 [JP] Japan .................................. 1-315289

[51] Int. Cl.⁵ .................................................. G11B 13/04
[52] U.S. Cl. .................................... 369/13; 369/275.5; 369/291
[58] Field of Search ............... 369/13, 291, 14, 292, 369/275.5; 360/59, 114; 365/122

[56] References Cited

U.S. PATENT DOCUMENTS 4,433,410 2/1984 Siryj et al. ............................ 369/291
4,592,042 5/1986 Lemelson ............................. 369/271
5,077,726 12/1991 Dodds et al. ........................ 369/291

FOREIGN PATENT DOCUMENTS

| 0116936 | 8/1984 | European Pat. Off. . |
| 0130364 | 1/1985 | European Pat. Off. . |
| 0275657 | 7/1988 | European Pat. Off. . |
| 0292309 | 11/1988 | European Pat. Off. . |
| 60-079581 | 7/1985 | Japan . |
| 63-268145 | 11/1988 | Japan . |
| 8800733 | 10/1989 | Netherlands . |

OTHER PUBLICATIONS

"Prototype Magneto-Optical Disk Drive", Uber et al, SPIE vol. 899, Optical Storage Technology and Applications, 1988, pp. 34-38.

"Web-Based Optical Disk Assemblies", Wheeler, et al., Proceedings of SPIE-The International Society for Optical Engineering, vol. 420, 1983, pp. 39-52.

Primary Examiner—Robert J. Pascal
Assistant Examiner—Tan Dinh
Attorney, Agent, or Firm—Antonelli, Terry, Stout & Kraus

[57] ABSTRACT

The information processor uses a portable memory which is able to be overwritten by laser power modulation system. The memory includes a disk type recording medium incorporated rotatably in a thin case, and carries out write/read/erase by means of a first magnetic field application device, a second magnetic field application device, and an optical head radiating light through this case.

12 Claims, 27 Drawing Sheets

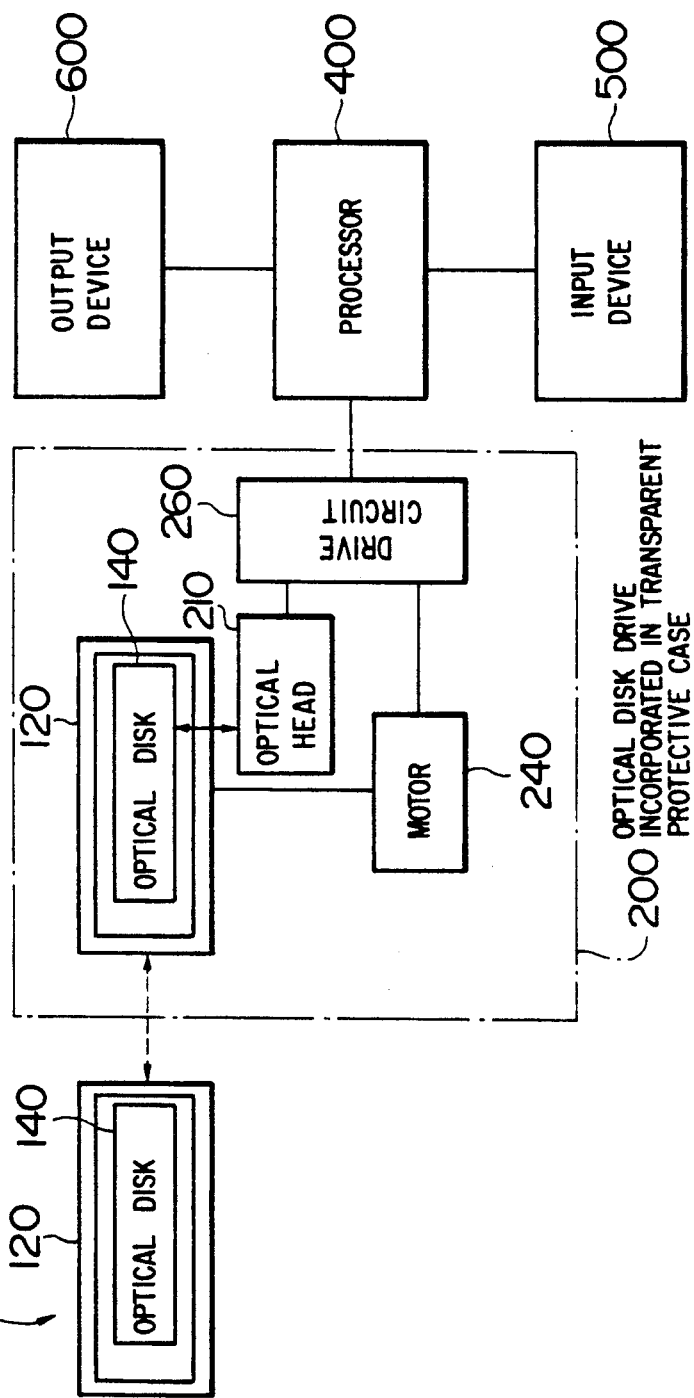

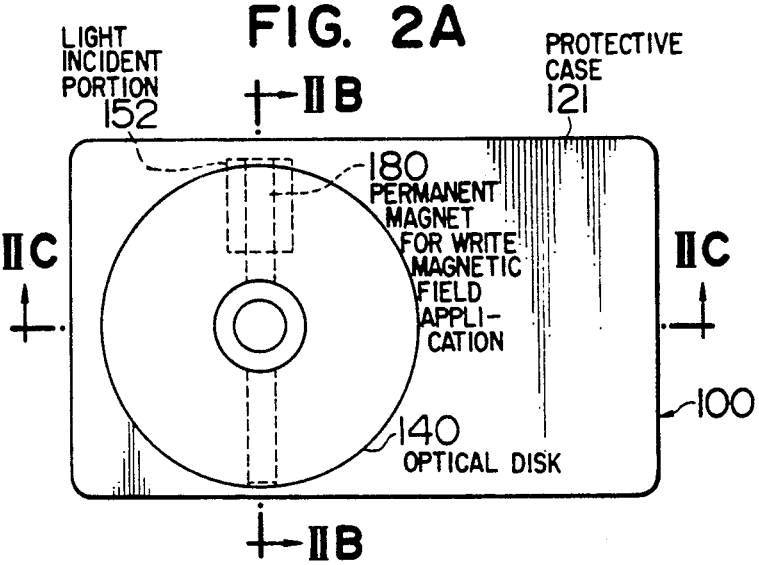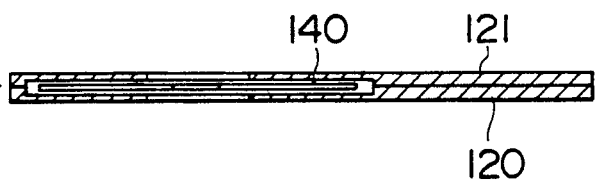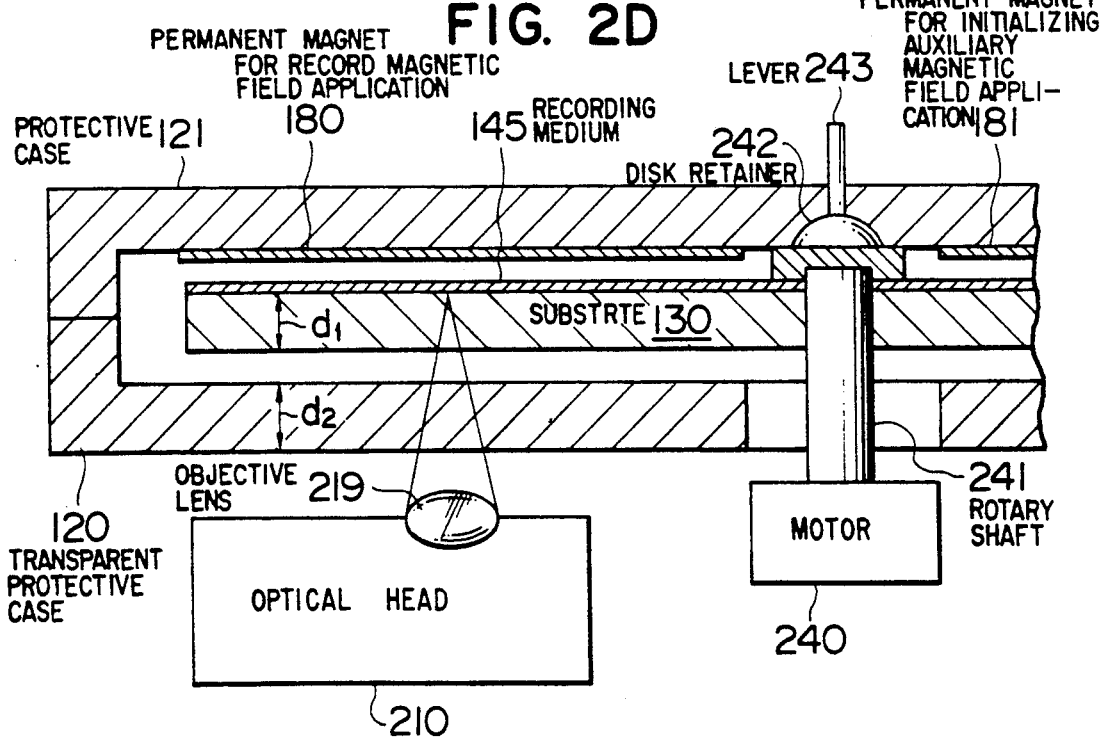

PRINCIPLES OF WRITE / READ / ERASE OF PHASE-CHANGE OPTICAL DISK

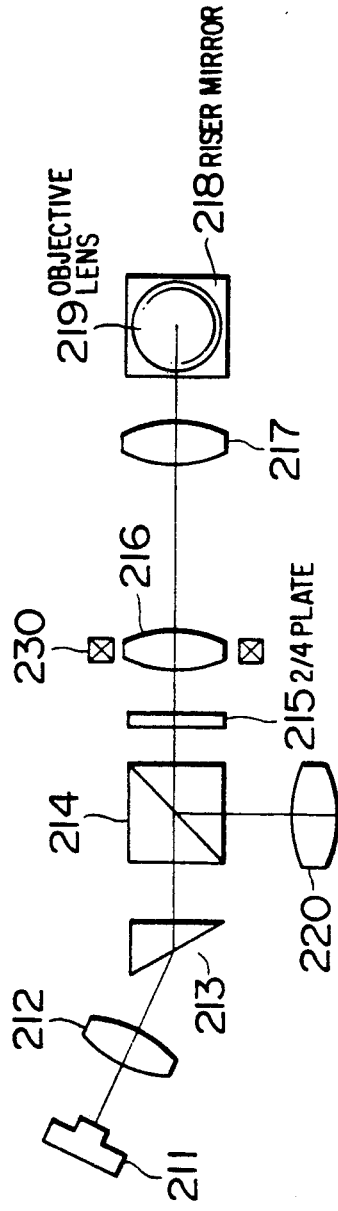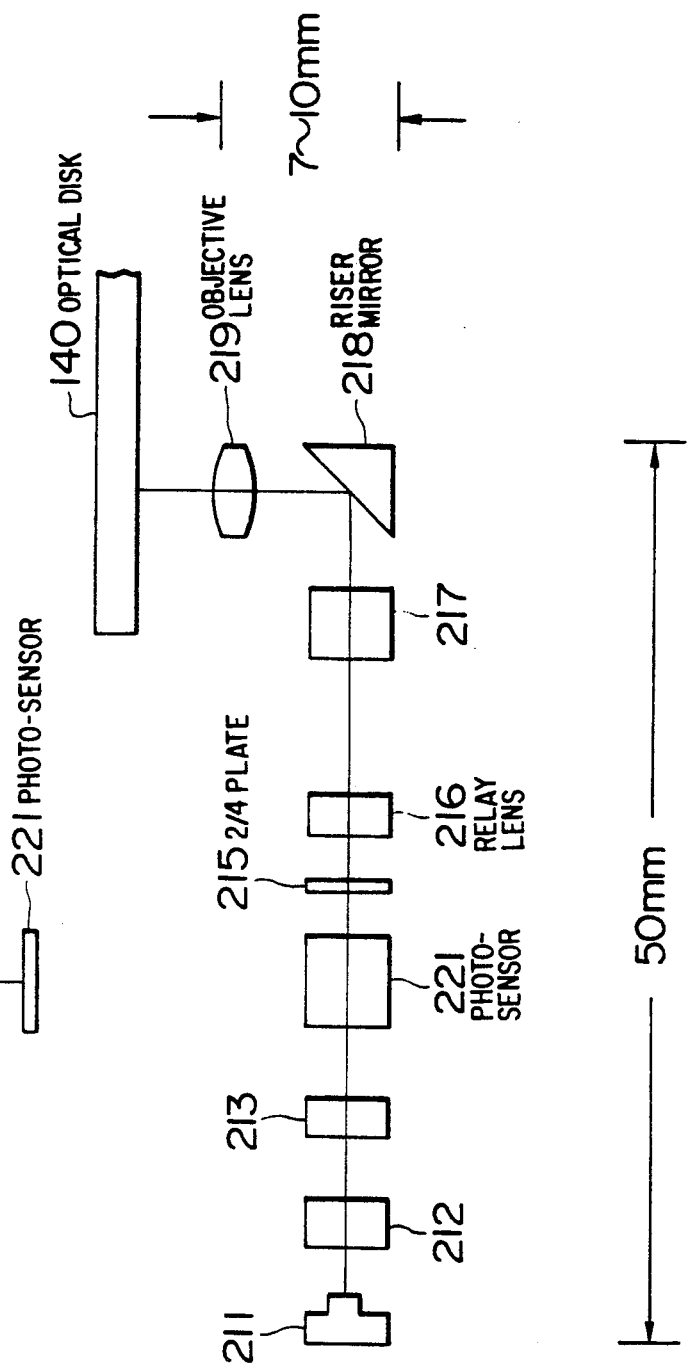
FIG. 14A
FIG. 14B

- 130 SUBSTRATE
- 141
- 145-1 RECORDING LAYER
- 145-2 AUXILIARY RECORDING LAYER
- 143
- 144
- 145a PROTECTIVE FILM

- 130 SUBSTRATE (OPAQUE APPLICABLE)
- 144 REFLECTING FILM
- 143
- 145-2 AUXILIARY RECORDING LAYER
- 145-1 RECORDING LAYER
- 141

(ENLARGED VIEW OF PORTION F)

(ENLARGED VIEW OF PORTION G)

XXIIIB-XXIIIB
SECTIONAL VIEW

FIG. 27
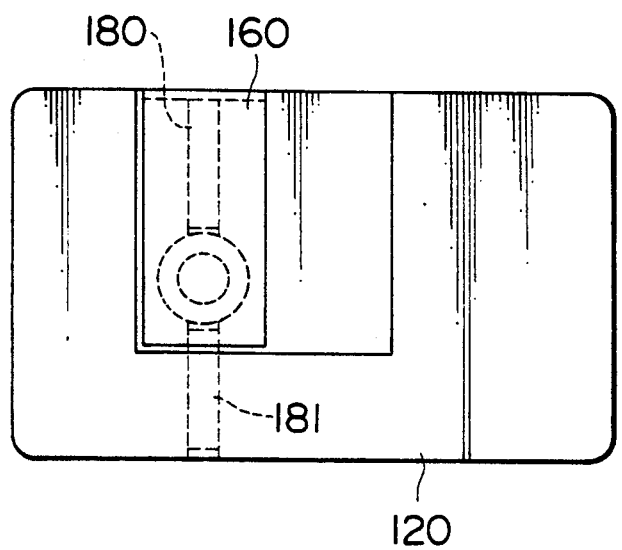
FIG. 28B    FIG. 28A
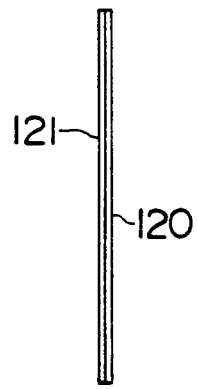
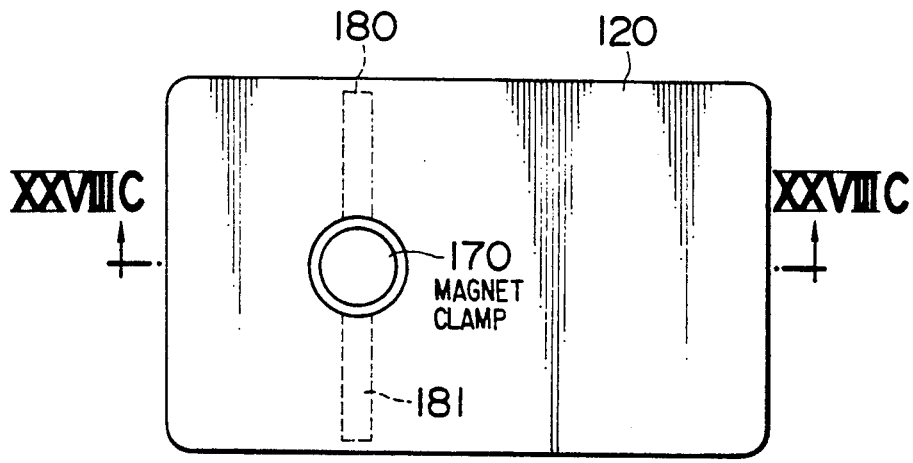
FIG. 28C
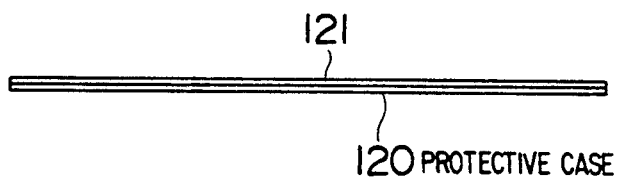

(ENLARGED VIEW OF PORTION K)

(ENLARGED VIEW OF PORTION L)

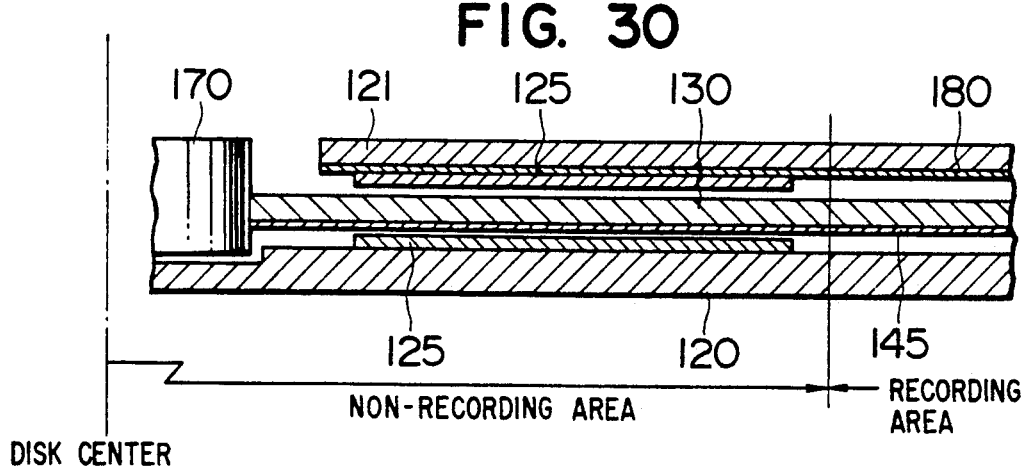
FIG. 30
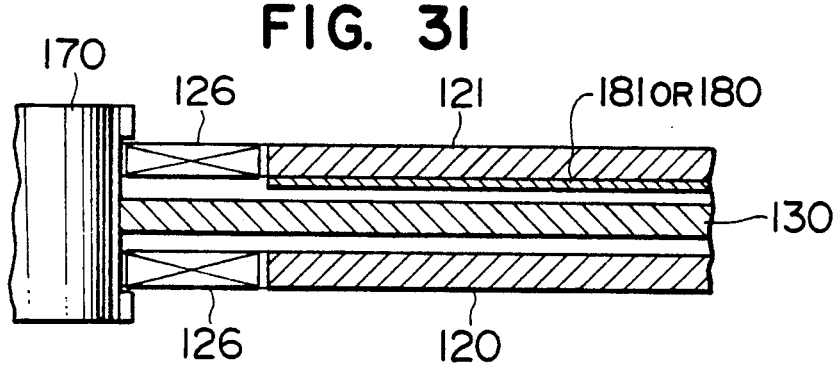
FIG. 31
FIG. 32B  FIG. 32A  FIG. 32D
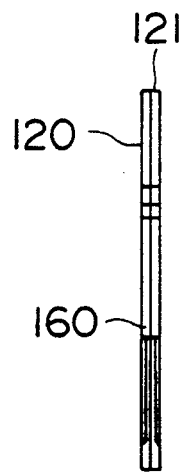 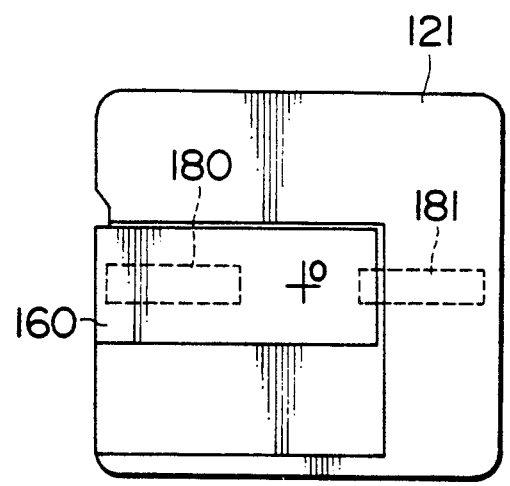 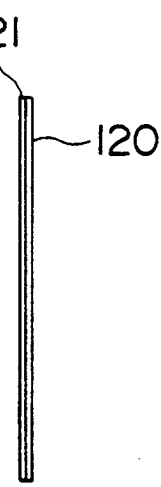
FIG. 32C
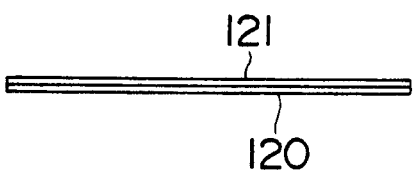

INFORMATION PROCESSOR AND DISK MEMORY USED IN THE SAME

This application is a Continuation-in-Part of application Ser. No. 584,079, filed Sep. 18, 1990 as now abandoned.

BACKGROUND OF THE INVENTION

The present invention relates to an information processor using a disk memory having a disk in the form of a portable recording medium capable of being subjected to operations of reading, writing, erasing, and/or overwriting and being disposed in a thin rectangular card-shaped case, and to the disk memory as used therein.

A recording medium which performs read/write of information while being rotated in a card-shaped case, such as an optical disk and a floppy disk, using a tellurium alloy, and being disposed in a flat space between coating materials, is described in JP-A-60-79581.

A magneto-optical disk memory device capable of overwriting by laser power modulation is described in JP-A-62-175948, but a permanent magnet for initializing the magneto-optical disk and a permanent magnet for writing are fixed to the optical disk memory device, and furthermore, an optical head is positioned on the opposite side of the magneto-optical disk from the permanent magnets. Moreover, in the magneto-optical disk, the optical disk medium is made to fixedly adhere onto a substrate having a thickness of approximately 1.2 mm so as to have light incident from the substrate side as a countermeasure against dust attaching thereto, and the optical disk is contained in a protective case for transportation, thus requiring a thickness of 6 to 10 mm for the overall optical disk memory device. Because of the fact that the substrate requires a thickness of 1.2 mm and the permanent magnet for initialization and the permanent magnet for recording are fixed on the side of the optical disk opposite the optical head in a conventional magneto-optical disk as described above, the thickness of this permanent magnet portion is added to the overall thickness of the device, thus not only making it difficult to miniaturize the optical disk, in particular to form it in a credit card size, but also limiting the ability to form a thin optical disk memory device.

On the other hand, a disk magneto-optical medium capable of overwriting on a glass substrate, having a thickness of 1.2 mm incorporated in a cartridge, a permanent magnet for application of an initializing auxiliary magnetic field incorporated in the cartridge, and a permanent magnet for recording installed in a recording device, is disclosed in JP-A-64-46247. However, it is difficult to miniaturize and make thin an optical disk, in particular to form it in a credit card size, when the cartridge is included, because a thickness of 1.2 mm is required for the substrate. Further, since the permanent magnet for recording is fixed on the opposite side of the disk with respect to the optical head, the thickness of this permanent magnet portion is added to the overall dimension of the unit, and thus, there has been a limit on how much the optical disk memory device can be made thinner. Moreover, there is also a problem in that the laser portion of the optical disk is liable to be damaged because the optical disk is exposed when the window of the cartridge cover is opened.

When a disk capable of operations of reading, writing, erasing, and/or overwriting by laser power modulation is used as a memory for a lap top computer or other type of portable information processor, it is desirable for the disk to be rectangular in configuration and to be in a card form or a sheet form from the point of view of thickness and to be provided with a protective case from the viewpoint of portability. In a conventional optical disk, however, because of the fact that the substrate requires a thickness of 1.2 mm as a countermeasure against dust, and particularly in the case of magneto-optical recording, the permanent magnet for initialization and the permanent magnet for recording are fixed on the opposite side of the optical disk with respect to the optical head. Thus, the thickness of this permanent magnet portion is added to the overall thickness of the device, which creates a limit on the formation of a thin film, and so it has been impossible to use such a conventional optical disk in a lap top computer or in a portable optical disk memory device.

SUMMARY OF THE INVENTION

It is an object of the present invention to provide an information processor using a disk memory card (hereafter abbreviated as "disk-in-card") including an optical disk using a portable recording medium capable of operations of reading, writing, erasing, and/or overwriting by a highly reliable laser power modulation system in a thin rectangular case, particularly in a card or a sheet, and a disk memory used therein.

In order to achieve the above-described object, the present invention has a feature in that a transparent substrate of 1.2 mm in thickness which has been heretofore used as a substrate for an optical disk is deleted, an opaque case which has been heretofore used is made transparent, and light for write/read/erase is made incident on the disk through the transparent case, thereby to make the thickness of the whole optical disk including the case thinner.

Furthermore, in order to achieve the above-described object, according to the present invention, an optical disk is mounted in a case of a credit card size which is convenient for transportation, thus realizing a memory of a large capacity which was previously unavailable with a conventional memory for a lap top computer.

The present invention has a feature in the provision of an optical disk contained in a case of a credit card size, thereby to provide a device which is convenient for transportation and in which a countermeasure against dust sticking to the optical disk is taken, and resulting in a memory of a large capacity of more than 10 MB, which has been impossible with a conventional card-sized memory.

An information processor of the present invention comprises a magneto-optical disk incorporated in a thin case including a disk type magneto-optical recording medium having a recording layer and an auxiliary recording layer which is capable of write, read or overwrite operations by laser power modulation, a thin case supporting the disk type magneto-optical recording medium rotatably and having at least a light incident portion which is transparent, and a first magnetic field application means for initializing said auxiliary recording layer, and a second magnetic field application means for recording in said recording layer both provided in the case. There is also provided an optical head which writes information into said magneto-optical recording medium or reads information already written therein or performs both operations, a rotation means which rotates said magneto-optical recording medium and a drive circuit which controls the operation of said optical head and the rotation speed of said rotation means, a processor which gives a command to said drive circuit, an input means which inputs information in said processor, and an output means which outputs information from said processor.

Further, the information processor comprises a magneto-optical disk-in-card including a rotatable disk magneto-optical recording medium composed of at least two layers including a recording layer and auxiliary recording layer for write/read or overwrite operations by laser power modulation incorporated in a case of a credit card size having a transparent portion, a first magnetic field application means for initializing an auxiliary recording layer and a second magnetic field application means for writing in the recording layer both incorporated in the case in which at least a light incident portion is transparent, an optical head for reading information recorded in the abovementioned magneto-optical recording medium, a rotation means which rotates the magneto-optical recording medium, a drive circuit which controls the operation of the optical head and the rotation speed of the rotation means, a processor which gives an instruction to the drive circuit, an input means which inputs information to the processor, and an output means which outputs information from the processor.

Furthermore, the information processor comprises a magneto-optical disk-in-card, in which at least a light incident portion is transparent, having a rotatable disk type magneto-optical recording medium composed of at least two layers including a recording layer and an auxiliary recording layer for write/read or overwrite operations by laser power modulation incorporated in a case of a credit card size, a first magnetic field application means for initializing an auxiliary recording layer and a second magnetic field application, means for recording in the recording layer incorporated in the case, a rotation means for rotating the magneto-optical recording medium, an optical head which reads the information written in the magneto-optical recording medium, a drive circuit which controls the operation of the optical head and the rotation speed of the rotation means, a processor which gives an instruction to the drive circuit, an input means for inputting information into the processor, and an output means for outputting information from the processor.

In the disk memory of the present invention, a thin case in which at least a light incident portion is made transparent, the light for write/read/overwrite is incident through the transparent portion of the case, a permanent magnet for initialization and a permanent magnet for writing are mounted in the disk-in-card which is convenient for transportation, and the thickness of the whole optical disk including the case is made thinner, thus forming a disk memory having a credit card size.

Furthermore, the disk memory is a magneto-optical disk-in-card in which a rotatable disk type magneto-optical recording medium composed of at least two layers including a recording layer and an auxiliary recording layer for write/read or overwrite of information by laser power modulation are mounted in a disk-in-card of a credit card size, a first magnetic field application means for initializing abovementioned auxiliary recording layer and a second magnetic field application means for recording in the recording layer are incorporated in the card case and at least a light incident portion of the case is made transparent.

Further, the disk memory is a magneto-optical disk-in-card in which a rotatable disk type magneto-optical write medium composed of at least two layers including a recording layer and an auxiliary recording layer for write/read or overwrite of information by laser power modulation are mounted in a disk-in-card of a credit card size, first magnetic field application means for initializing the abovementioned auxiliary recording layer and second magnetic field application means for recording in the recording layer are incorporated in the card case, a rotation means for rotating the magneto-optical recording medium is further incorporated in the case, and at least a light incident portion of the case is made transparent.

Furthermore, the disk memory is a magneto-optical disk-in-card in which a rotatable disk type magneto-optical recording medium composed of at least two layers including recording layer and an auxiliary recording layer for write/read or overwrite of information by laser power modulation are mounted in a disk-in-card of a credit card size, a first magnetic field application means for initializing an auxiliary recording layer and a second magnetic field application means for recording in the recording layer are incorporated in the card case wherein a magneto-optical disk which is 48 to 54 mm in diameter and has 10 MB in recording capacity and above is mounted in the disk-in-card, and at least a light incident portion of the case is made transparent.

Moreover, the disk memory is a magneto-optical disk-in-card in which a rotatable disk type mageneto-optical recording medium composed of at least two layers including a recording layer and an auxiliary recording layer for write/read or overwrite of information by laser power modulation are mounted in a disk-in-card of a credit card size, a first magnetic field application means for initializing the abovementioned auxiliary recording layer and a second magnetic field application means for recording in the recording layer are incorporated in the card case, further including rotation means which rotates the magneto-optical recording medium, wherein a magneto-optical disk which is 48 to 54 mm in diameter and has 10 MB in recording capacity, and above is disk-in-card and at least a light incident portion of the case is made transparent.

Besides, the total thickness of the disk type magneto-optical recording medium and the case at the portion irradiated with light is approximately 1.2 mm.

A thin disk is formed by making the total thickness of the disk type magneto-optical recording medium and the case at the portion irradiated with light at approximately 1.2 mm.

Further, an information processor of the present invention comprises an optical disk incorporated in a thin flat case having a disk optical recording medium which is formed on a transparent substrate to write/read or overwrite information by irradiating the optical recording medium with light and a transparent thin case which supports the optical recording medium rotatably and includes at least a transparent light incident portion, in which the total thickness of the substrate and the case at the light incident portion is approximately 1.2 mm, an optical head which writes information in the abovementioned optical recording medium or reads information already recorded therein or performs both, a rotation means which rotates the abovementioned optical recording medium, and a drive circuit which controls the operation of the optical head and the rotation speed of the rotation means.

Furthermore, the information processor comprises an optical disk incorporated in a thin flat case having a disk type optical recording medium which is formed on a transparent substrate to write/read or overwrite information by irradiating the optical recording medium with light and a transparent thin case which supports the optical recording medium rotatably and includes at least a transparent light incident portion, in which the thickness of the case at the light incident portion is approximately 1.2 mm, an optical head which records information in the abovementioned optical recording medium or reads information already written therein or performs both, a rotation means which rotates the abovementioned optical recording medium, and a drive circuit which controls the operation of the optical head and the rotation speed of the rotation means.

Also, it is preferable that there are provided a disk type optical recording medium formed on a transparent substrate for writing or reading information by irradiation of the optical recording medium with light and a case which covers the recording medium and the substrate and in which the portion irradiated with light is transparent at least on the substrate, and that the total thickness of the abovementioned substrate and the case at the portion irradiated with light is approximately 1.2 mm.

Further, it is preferable that there are provided a disk type optical recording medium formed on a substrate for writing or reading information by irradiation with light and a case which covers the recording medium and the substrate and in which the portion irradiated with light is transparent at least on the recording medium, and that the thickness of the case at the portion irradiated with light is approximately 1.2 mm.

Besides, an optical disk which is 48 to 54 mm in diameter and has more than 10 MB in recording capacity and above is provided in the form of a disk-in-card.

Further, an information processor of the present invention comprises an optical head which performs at least one operation of write, read and erase of information on a recording medium formed on a substrate by irradiating light on an optical memory incorporated rotatably in a case having a transparent portion through which the abovementioned light is irradiated, a rotation means which rotates the abovementioned recording medium, and a drive circuit which controls the optical head and the operation of the abovementioned rotation means.

Furthermore, the information processor comprises an optical memory having a recording medium formed on a substrate incorporated rotatably in a case having a transparent portion, an optical head which performs at least one operation of write/read/erase of information on the abovementioned recording medium through the transparent portion of the case, a rotation means which rotates the recording medium, and a drive circuit which controls the optical head and the operation of the rotation means.

According to the present invention, a rotatable disk magneto-optical recording medium composed of at least two layers including a recording layer and an auxiliary recording layer for write/read or overwrite of information by laser power modulation are mounted in an disk-in-card of a credit card size, and a light incident portion for write/read or overwrite includes a first magnetic field application means which initializes the abovementioned auxiliary recording layer in a transparent card case, thereby to realize a magneto-optical disk-in-card of a credit card size. Furthermore, it is possible to make the magneto-optical disk memory device thinner by utilizing this magneto-optical disk-in-card construction.

Since a conventional optical disk uses a substrate having a thickness of 1.2 mm and placed in a protective case 1 to 2 mm in thickness, the total thickness of 6 to 10 mm has been required for the optical disk and the protective case. On the contrary, the present invention has a feature in that a countermeasure against dust sticking to the optical disk is taken by providing a protective case, which has been heretofore opaque, with a transparent protective plate and radiating an optical beam for write/read/erase through this transparent protective plate. With this, it has become possible to reduce the thickness of a substrate to a thickness much less than 1.2 mm, which has been deemed indispensable conventionally for an optical disk, and to make the thickness of the whole optical disk memory including the case thinner.

According to the present invention, it is possible to provide an information processor which protects the disk against dust and dirt and is able to prevent a read mistake caused by dust and dirt at the same time. Furthermore, it is possible to realize a thin lap top computer having a memory of large capacity, a still camera having a memory of a large capacity and a medical portable personal data base having a large capacity memory by utilizing the disk-in-card of the present invention.

BRIEF DESCRIPTION OF THE DRAWINGS

FIG. 1 is a block diagram showing a device forming a embodiment of the present invention;

FIG. 2A is a plan view showing an embodiment of a magneto-optical disk-in-card of the present invention;

FIG. 2B is a sectional view taken along line IIB—IIB in FIG. 2A;

FIG. 2C is a sectional view taken along line IIC—IIC in FIG. 2A;

FIG. 2D is an enlarged sectional view of the section shown in FIG. 2C;

FIG. 14A is a diagram showing an embodiment of an optical head for a phase-change optical disk;

FIG. 14B is a side view of the optical head shown in FIG. 14A;

FIG. 27 is a plan view showing another embodiment of a magneto-optical disk-in-card;

FIG. 28A is a plan view showing still another embodiment of the optical disk-in-card;

FIG. 28B and FIG. 28C are respective side views of the magneto-optical disk-in-card shown in FIG. 28A;

FIG. 30 and FIG. 31 are sectional views showing other examples in which countermeasures for preventing mixing of dust and dirt into the recording area of an optical disk are taken;

FIG. 32A is a plan view showing another embodiment of an optical disk-in-card;

FIG. 32B thru FIG. 32D ar respective side views of the optical disk-in-card shown in FIG. 32A;

DETAILED DESCRIPTION OF THE EMBODIMENTS

Figure 3:
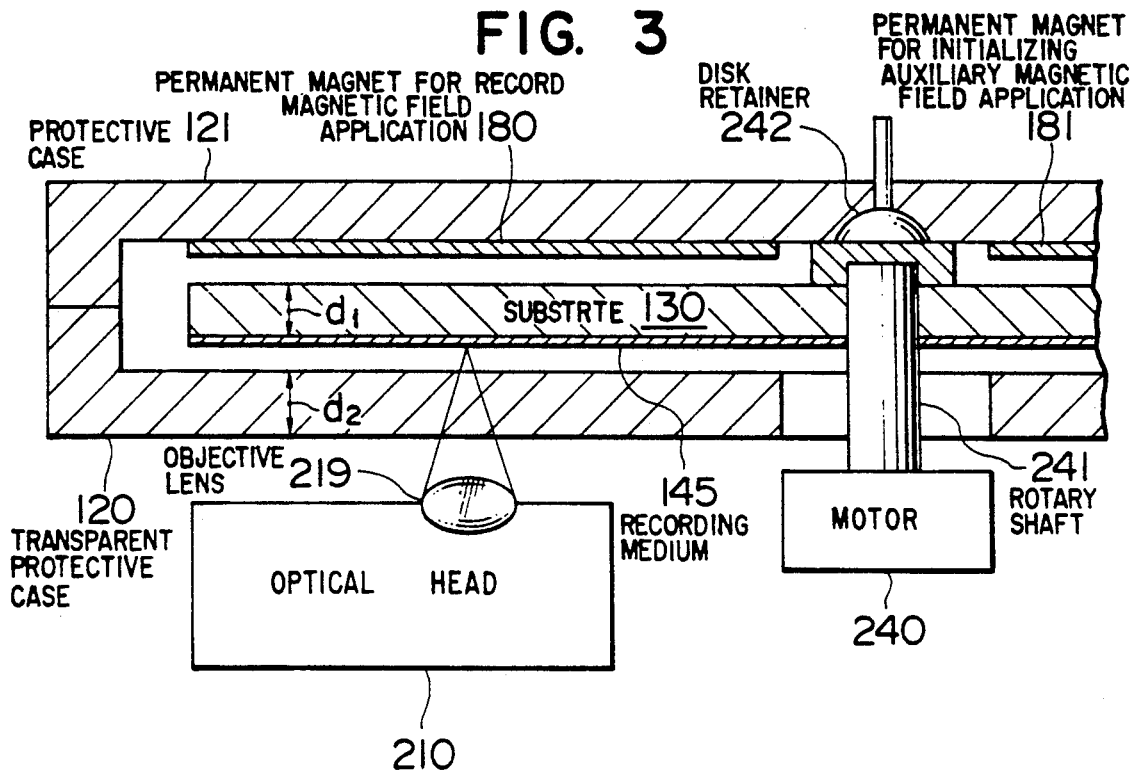
FIG. 3 is a sectional view showing another embodiment of FIG. 2D.

An embodiment of the present invention will be described hereafter with reference to the drawings. FIG. 1 shows a conceptual diagram of an information processor of the present invention.

The information processor of the present invention is composed of a optical disk-in-card 100 consisting of a transparent protective case 120 housing at least one recording layer of a rotatable disk type optical disk memory 140, an optical disk drive, a processor 400, an input means 500 and an output means 600.

The magneto-optical disk-in-card 100 incorporated in a transparent protective case is composed of a transparent protective case 120 housing a magneto-optical disk memory 140, a first magnetic field application means for initializing an auxiliary recording layer and a second magnetic field application means for recording information on a recording layer, and is detachable from the disk drive 200.

Furthermore, an optical disk memory of the phase-change type, write-once type, and/or read-only type may also be used in place of the magneto-optical disk memory 140. In this case, the optical disk incorporated in a transparent protective case is composed of an optical disk and a transparent protective case.

Further, the disk drive 200 is composed of an optical head 210 for write, read and overwrite, a motor 240 for rotating the optical disk 140 and a drive circuit 260 for controlling the optical head 210 and the motor 240. The optical head 210 is provided with an objective lens 219 for irradiating the optical disk 140 with light.

The drive circuit 260 controls the rotation speed of the motor 240 and also fulfils functions of modulation of data for write/overwrite operations and demodulation of data for a read operation in accordance with an instruction from the processor 400.

Further, the processor 400 performs arithmetic processing or write/read to and from the magneto-optical disk 140 in accordance with instructions from the input means 500, and outputs the written information in the magneto-optical disk 140 or processing results through the output means 600.

FIG. 2A, FIG. 2B, FIG. 2C and FIG. 2D show an embodiment of the magneto-optical disk-in-card incorporated in a transparent protective case best suited for executing the present invention. Besides, the optical head 210 and the motor 240 for rotating the optical disk 140 are shown additionally in the detailed portion of the magneto-optical disk-in-card. At the terminal portion of a rotary shaft 241 extending from the motor 240, a disk retainer 242 and a level 243 are provided so as to fix the optical disk 140.

As shown in respective figures, the magneto-optical disk 140 is incorporated in a protective Case 120, 121 of a credit card size in the magneto-optical disk-in-card 100 of the present embodiment. A permanent magnet 18 for magnetic field application for initializing the auxiliary recording layer and a permanent magnet 181 for magnetic field application for writing in the recording layer are formed on the disk in the transparent protective case 121. It is better for the permanent magnet for magnetic field application for initialization and the permanent magnet for magnetic field application for recording to be fixed both at a length a little longer than the radial length of the recording area of the magneto-optical disk of the magneto-optical disk memory card because initialization and writing can be executed up to the innermost periphery or the outermost periphery of the disk. Further, configurations of the permanent magnet for magnetic field application for initialization and the permanent magnet for magnetic field application for recording may be rectangular when the rotation speed of the disk is as low as 1,800 rpm. When the rotation of the disk reaches 3,600 rpm and higher, it is more preferable to form the configurations of the permanent magnet for magnetic field application for initialization and the permanent magnet for magnetic field application for writing in sectors so that the circular arc is small at the inner periphery of the disk and the circular arc is large at the outer periphery of the disk for initialization and writing. The manufacture of the permanent magnet for magnetic field application for initialization and the permanent magnet for magnetic field application for writing may be made by cutting out of a bulk material and adhering with adhesives, or by any of thin film forming methods such as a vacuum deposition method, a sputtering method and an ion beam sputtering method.

At least a light beam incident portion 152 of the protective case is composed of a transparent plate in the magneto-optical disk 140.

In a conventional magneto-optical disk unit, a window of the protective case was opened so that light could be directly incident on the optical disk when light was directed toward the disk. Therefore, dust and dirt entered through the window, and it was required to use a transparent substrate having a thickness of 1.2 mm for the substrate as a countermeasure thereagainst.

On the contrary, since the light incident portion 152 is covered with the transparent protective case 120 in the magneto-optical disk-in-card of the present invention, dust and dirt will never stick directly on the optical disk. Accordingly, the substrate for supporting the optical disk medium need not have a thickness of 1.2 mm. According to the present invention, dust in the air does not stick to a substrate 130 and a reading medium 145 consisting of an auxiliary recording layer and recording layer, thus producing an effect that the substrate having a thickness of 1.2 mm, which has been heretofore deemed indispensable, may be made thinner by forming the total of the plate thickness $d_2$ of the transparent protective case 120 and the plate thickness $d_1$ of the substrate 130 in approximately 1.2 mm.

FIG. 3 shows another embodiment in place of FIG. 2D. When the thickness $d_2$ of the transparent protective plate is made at approximately 1.2 mm, it is not required to have light incident from the substrate 130 side, thus making it possible to use for the substrate 130 a metal, a metallic foil and an organic material having no light permeability, such as an aluminum foil made thinner by cold processing and an alloy foil thereof, a stainless steel foil, and a titanium foil or an alloy foil thereof.

Further, the magneto-optical disk is fixed to the rotary shaft 241 and rotated, but is retained by the disk retainer 242 for stable rotation. Besides, the portion of the protective case 121 on which no light is incident may be either transparent or opaque.

Moreover, in the magneto-optical disk-in-card of the present invention, the magneto-optical disk 140 is not fixedly attached to the protective case 120, 121, but is made rotatable freely therein.

Figure 4:
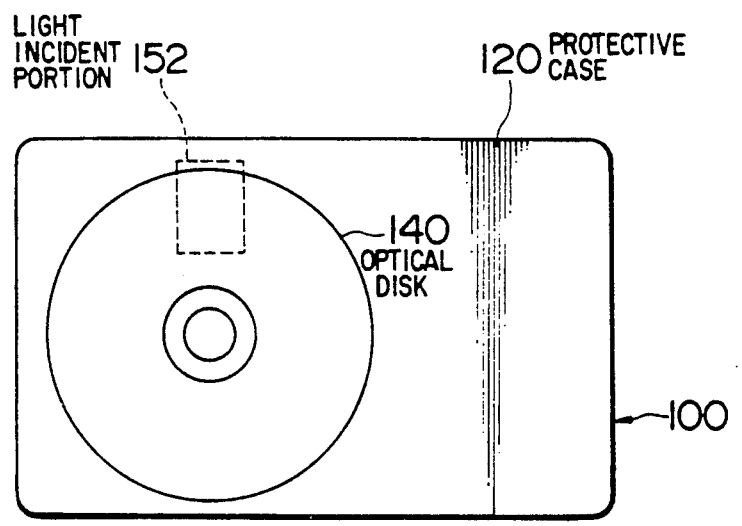
FIG. 4 is a plan view showing an optical disk-in-card.

FIG. 4 shows an embodiment of an optical disk memory such as a phase-change type, write-once type, and/or read-only type contained in a transparent protective case (hereafter referred to as an "optical disk-in-card") best suited to realize an optical disk memory of the present invention, and the section of this figure is the same as FIG. 2C. Referring to FIG. 2C, the optical disk 140 incorporated in the protective case 120, 121 each of a card size in the optical disk-in-card 100. Here, at least the light beam incident portion 152 of the protective case is formed of a transparent protective plate.

In a conventional optical disk unit, the window of the protective case was also opened like a mageneto-optical disk unit so as to have light incident directly to the optical disk when light was incident. Therefore, since dust and dirt entered through the window for light incidence, it was a requirement to use a transparent substrate having a thickness of 1.2 mm for the substrate as a countermeasure.

On the contrary, since the light incident portion 152 is covered with the transparent protective case 120 in the optical disk memory of the present invention, dust and dirt will never stick directly on the optical disk, thus the thickness of the substrate for supporting the optical disk medium does not need to be 1.2 mm.

Further, in the optical disk memory of the present invention, the optical disk 140 is not fixedly attached to the protective case 120, but is made rotatable freely therein.

Figure 5A:
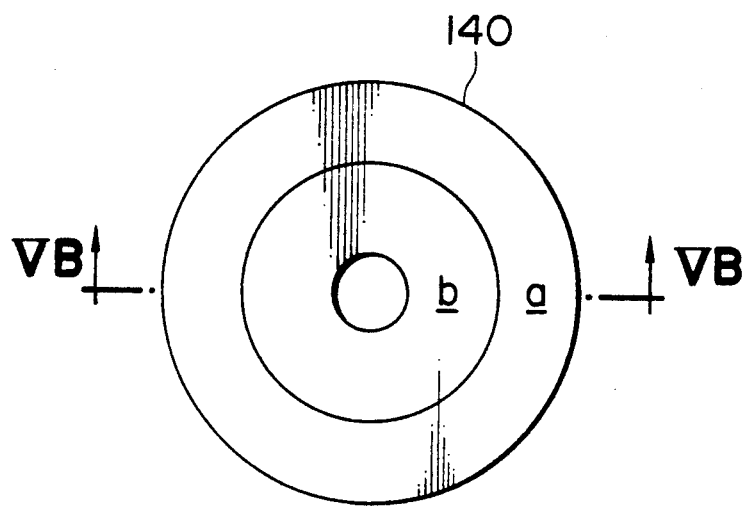
FIG. 5A is a plan view showing an optical disk in the optical disk-in-card.
Figure 5B:
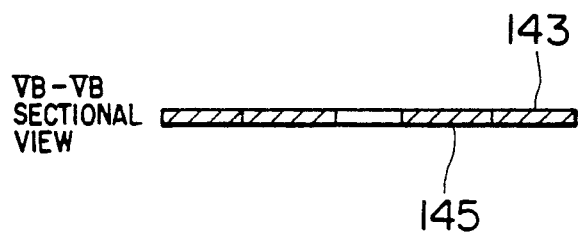
FIG. 5B is a sectional view taken along line VB—VB in FIG. 5A.

FIG. 5A and FIG. 5B show an embodiment of an optical disk in the optical disk-in-card 100. The optical disk 140 is formed of a substrate 143 and a recording medium 145. In these figures, a indicates a recording area and b indicates a non-recording area.

Here, the memory capacity for an optical disk-in-card is estimated. In the field of an IC card and a memory card, the outside dimension of a card has been already standardized, and the overall size is approximately 54 mm × 86 mm.

In the optical disk-in-card 100 of the present invention, it is preferable that the size of the protective case is also substantially in accordance with the size of the card in order to be used as a portable memory.

Thereupon, the memory capacity is estimated here assuming that a protective case having the overall size of 54 mm × 86 mm is used. Since the breadth is 54 mm, it is preferable that the outside dimension of the optical disk is 50 mm and less when 1 mm is assigned to edges, respectively. Further, since it is preferable that the recording area a in the optical disk is located about 1 mm inside the overall size of the disk, the outside diameter of the recording area a is preferably at approximately 48 mm.

On the other hand, the inside diameter of the recording area a is determined depending on the sizes of the hub fitting for disk rotation and the disk retainer portion. Since about 15 to 28 mm is sufficient for the disk retainer portion, it may be concluded that 15 mm to 48 mm may be used as the recording area. When the outside dimension of the recording area is given, the memory capacity reaches the maximum when the inside diameter is selected at half of the outside dimension.

Thereupon the memory capacity when 24 mm to 48 mm is used as the recording area is estimated here. When an ordinary optical disk system is used, 1.6 μm is adopted as the spacing between tracks. Therefore, 7,500 tracks are obtained when the number of tracks are estimated as indicated above. Besides, since the bit density is approximately 1.4 μm/bit, the number of bits per track is obtained at approximately 53.8 Kbits per track.

Accordingly, a recording capacity of approximately 50 MB (mega bytes) is obtainable at the time of unformat for the whole recording area.

Figure 6:
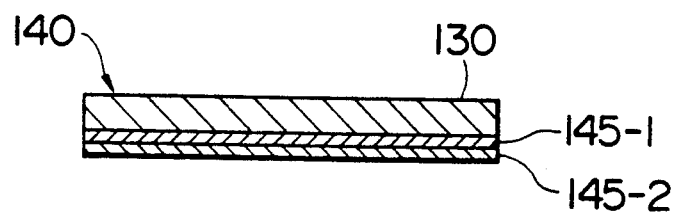
FIG. 6 is a sectional view of a magneto-optical disk.

FIG. 6 shows an embodiment of an magneto-optical disk in the magneto-optical disk-in-card 100. The magneto-optical disk 140 is composed of the recording medium 145 consisting of the substrate 130, the auxiliary recording layer and the recording layer. FIG. 6 is a partial sectional view showing another embodiment of the magneto-optical disk 140 shown in FIG. 5A. When light is incident from the substrate 130 side as shown in FIG. 2D, the substrate 130 needs to be transparent with respect to the wavelength of light employed. Among recording media, 145-1 becomes the write layer and 145-2 becomes the auxiliary recording layer. Further, 145-1 becomes the auxiliary recording layer and 145-2 becomes the recording layer among recording medium when light is incident from the side of the recording medium 145 as shown in FIG. 3. In the case of the latter, the substrate 130 may be either transparent or opaque.

Here, the capacity, etc. of the memory for the magneto-optical disk-in-card is substantially similar to that of the memory for the optical disk-in-card.

That is, it becomes possible to make an optical or magneto-optical disk-in-card thinner, and in its turn to make an information processor such as a lap top computer thinner.

Figure 7:
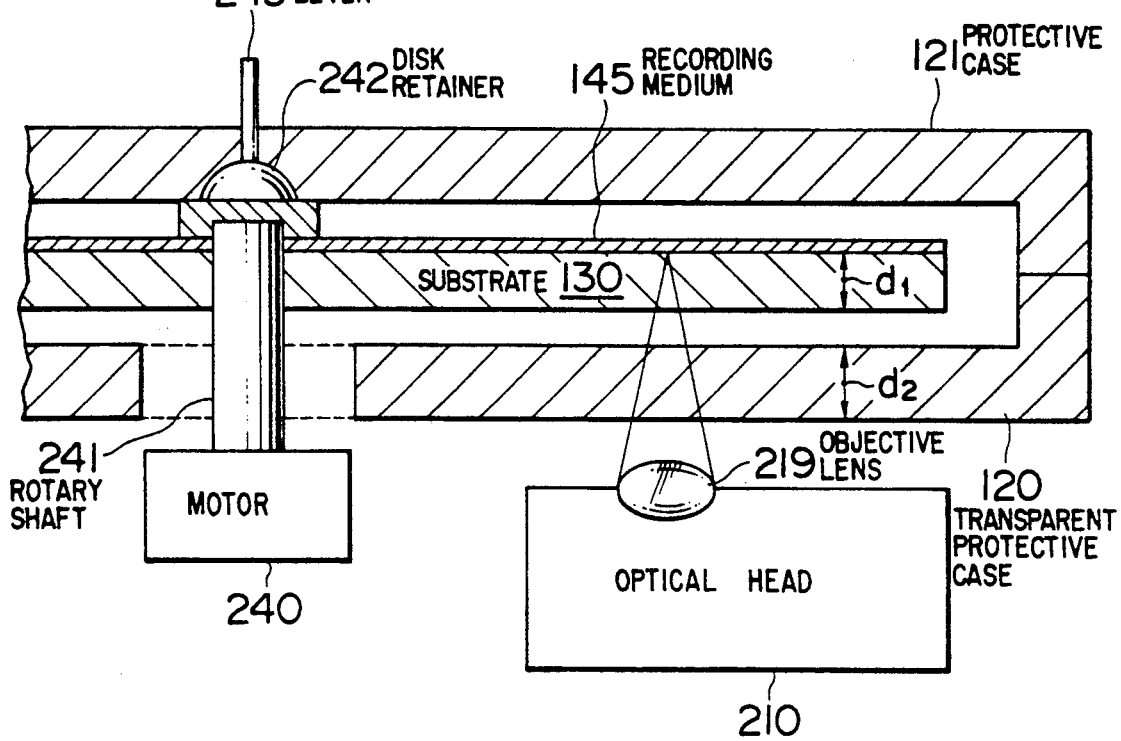
FIG. 7 is an enlarged sectional view showing an optical disk-in-card.
Figure 8:
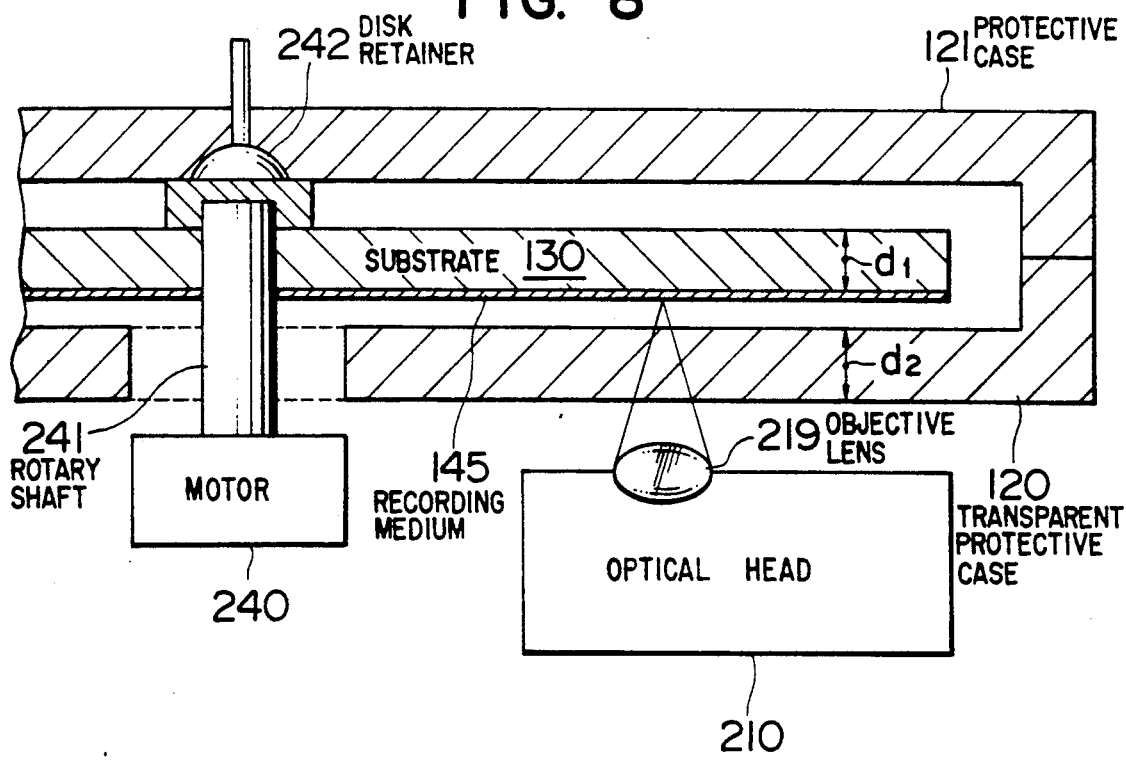
FIG. 8 is an enlarged sectional view showing another embodiment of the optical disk-in-card.

FIG. 7 and FIG. 8 are for explaining the concept of the present invention using an optical disk-in-card, and correspond to FIG. 2D and FIG. 3. With this, it becomes possible to make the optical disk thinner, and in its turn to make an information processor such as a lap top computer thinner.

As shown in FIG. 7, the present invention is composed of the substrate 130 supporting the recording medium 145, a protective case 120, 121 for protecting them, the motor 240 for rotating a disk and the optical head 210. The optical head may be realized essentially with an optical system as described in Nikkei Electronics, Nov. 21, 1983, pp. 189–213.

Write/read/erase operations of the optical disk are implemented with as follows. That is, new information is recorded on old information by modulating the power of a semiconductor laser in the optical head 210 between an erasing power and a writing power at the time of write/erase.

Further, the reflectance of the optical disk is read by reducing the semiconductor laser power to a comparatively small power and radiating it continuously at the time of reading. Here, a feature of the present invention exists in that a laser beam is radiated to the recording medium 145 through the transparent protective case 120.

That is, according to the present invention, there is such an effect that dust in the air will never stick to the substrate 130 and the recording medium 145, and the substrate having a thickness of 1.2 mm which has been heretofore deemed indispensable may be made thinner by making the total of the plate thickness $d_2$ of the transparent protective case 120 and the plate thickness $d_1$ of the substrate 130 approximately 1.2 mm.

Similarly, when the thickness $d_2$ of the transparent protective plate of the present invention is made to be approximately 1.2 mm as shown in FIG. 8, it is not necessary to have light incident from the substrate 130 side, then a material having no light permeability can be used for the substrate 130. Further, the optical disk is fixed to the rotary shaft 241 and rotated, but is retained by the disk retainer 242 for stable rotation. Furthermore, since the protective case 121 is not a light incident portion, it may be either transparent or opaque.

Next, a recording medium best suited to realize the present invention will be explained. As the recording medium, a read-only medium such as a compact disk, a write once optical recording medium utilizing hole boring and phase-change, and a reversible optical read medium utilizing magneto-optical effect and phase-change may be used. That is, any medium which is able to read or write/erase by means of a laser beam may be used as a medium in the present invention.

Figure 9:
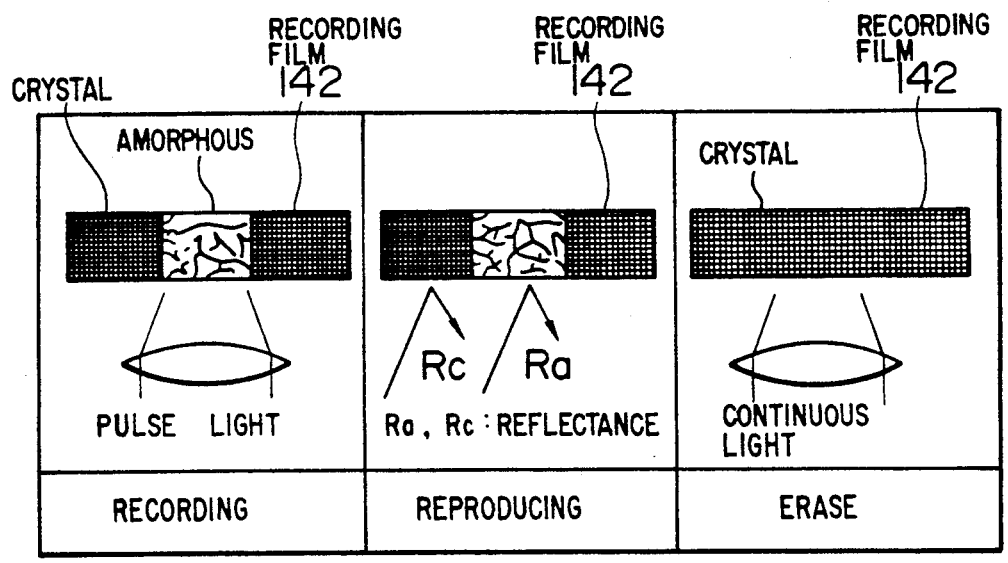
FIG. 9 is an explanatory diagram of principles of write/read/erase of a phase-change optical disk.

Here, an example of write/erase/read operations utilizing a reversible phase-change optical disk will be explained. FIG. 9 shows principles of write/erase/read operations of a phase-change optical disk. As shown in the figure, writing is realized by irradiating a recording medium with a laser beam of comparatively high power and quenching a recording film 142 after melting, thereby to bring the recording film 142 under an amorphous state. On the other hand, erasing is realized by irradiating the recording film 142 with a laser beam of comparatively low power and bringing the recording film 142 in an amorphous state under a crystallized state. Further, reading is performed in such a manner that the recording medium is irradiated with continuous light of a further lower power, thereby to read information by the difference between reflection factors under amorphous and crystallized states.

Any phase-change medium such as an In-Sb-Te recording film described in Proc. Soc. Photo-Opt. Inst. Eng. (SPIE), Vol. 1078, pp. 11–26, (1989) or a recording film capable of overwrite described in Proc. Soc. Photo-Opt. Inst. Eng. (SPIE), Vol. 1078, pp. 27–34, (1989) may be used as the recording film 142.

Figure 10:
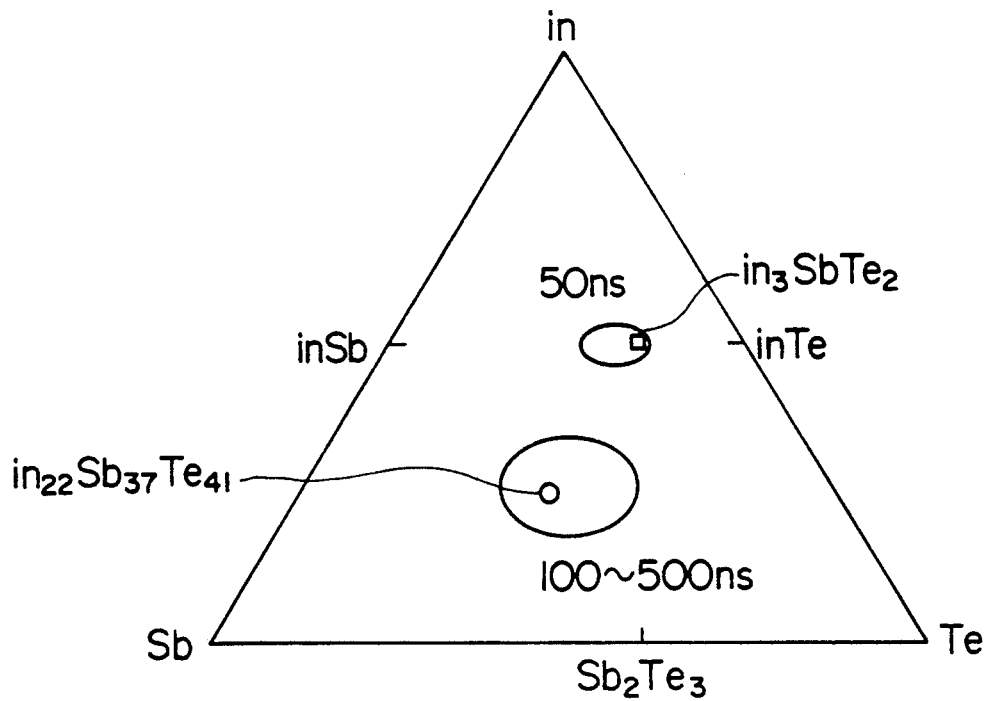
FIG. 10 is a diagram showing a crystallizing speed of an In-Sb-Te write medium which is an example of a material for a phase-change optical disk.

FIG. 10 shows the crystallization time of an In-Sb-Te material, but this recording film 142 has different crystallization times depending on the composition of the material and has a crystallization time ranging from 50 ns to 500 ns. Although there is a variation to some extent in selecting which crystallization time to be adopted depending on a linear velocity v(m/s) of the optical disk and a film structure of the optical disk medium, it is preferable to adopt a recording film having a crystallization time in the range of approximately from 500/v ns to 1,500/v ns.

Figure 11:
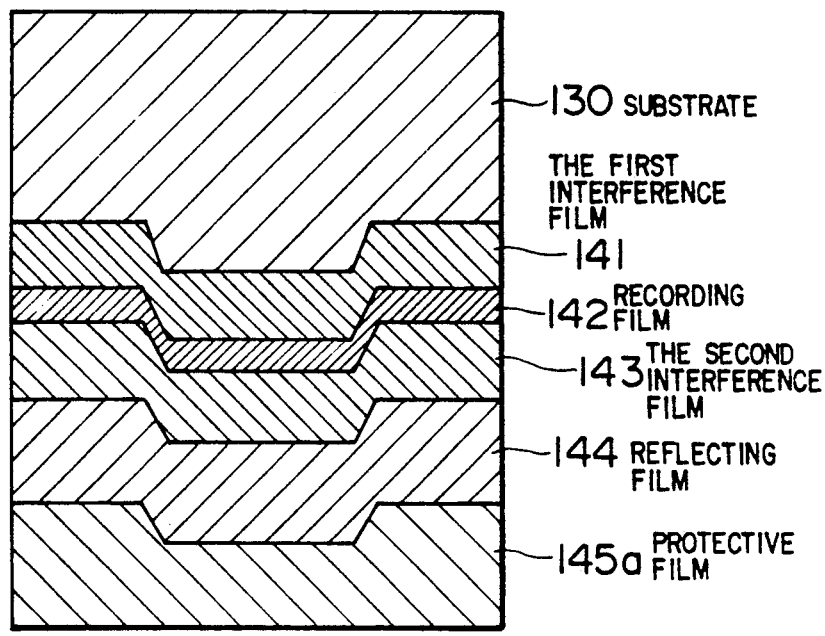
FIG. 11 and FIG. 12 are sectional views showing a multilayer film composition of the optical disk.

Further, FIG. 11 shows a film structure best suited to be used for the optical disk medium shown in FIG. 7. The optical disk medium is composed of a light permeable substrate 130, a first light interference film 141 having a high refractive index characteristic, a recording film 142, a second light interference film 143 having a high refractive index characteristic, a reflecting film 144 and a protective film 145a. In such an optical disk medium, light is incident from the substrate side.

Figure 12:
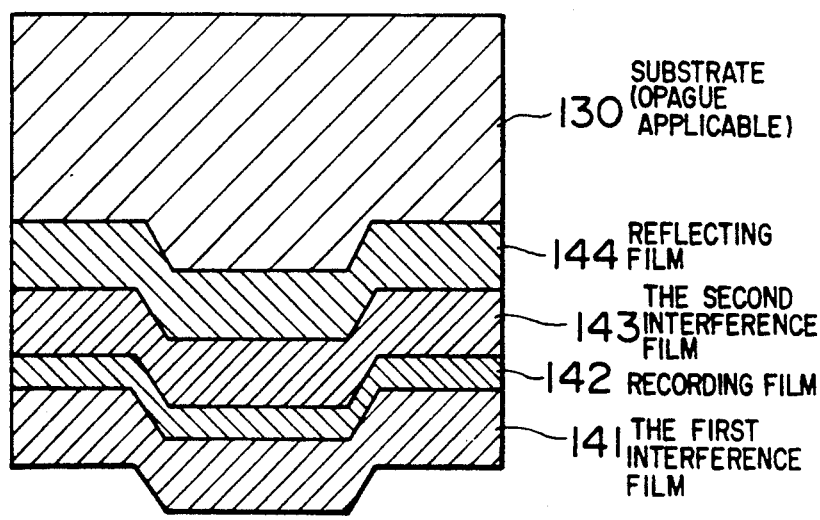

On the other hand, FIG. 12 shows a film structure best suited to be used as the optical disk medium shown in FIG. 8. In this case, a feature exists in that the order from the first light interference film 141 to the reflecting film 144 is reversed because the laser beam is incident from the protective film. Here, the interference film fulfils the functions of improvement of contrast by light interference and a control film of heat conduction characteristic.

Figure 13:
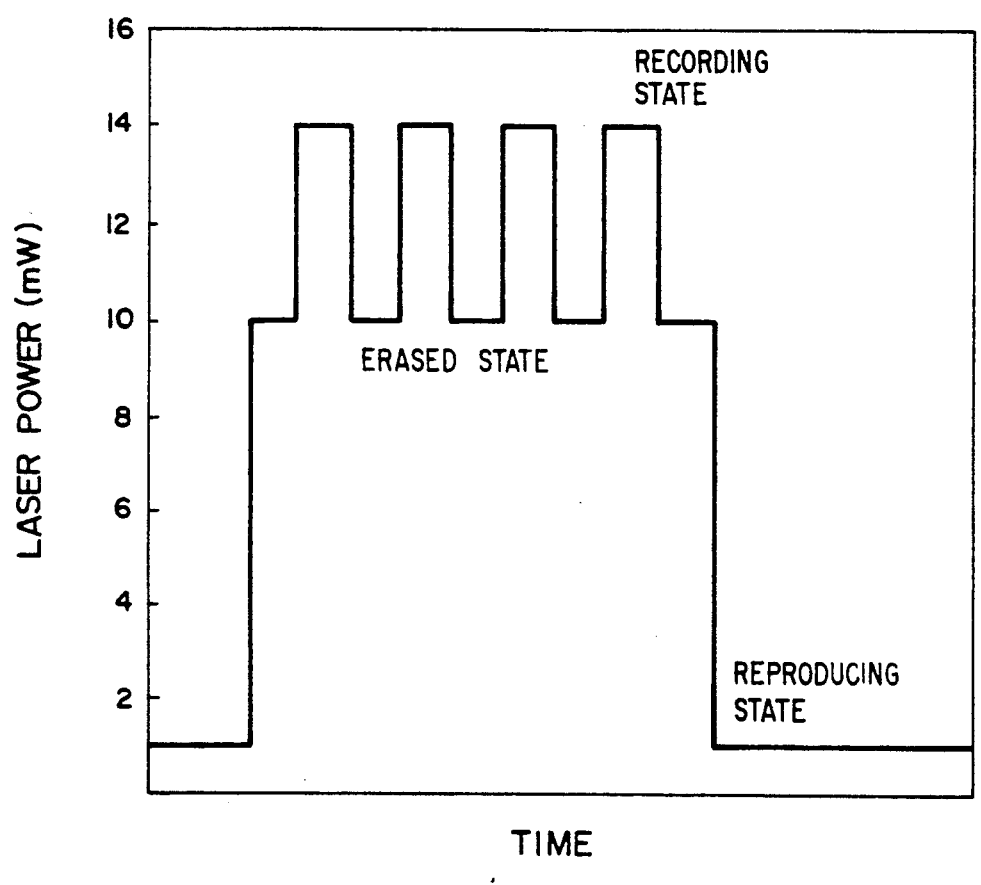
FIG. 13 is an explanatory view of method of modulation of laser power.

FIG. 13 shows a modulation method of the laser power at the time of overwriting. That is, the laser power is modulated between the power level for erasing and the power level for recording at the time of overwriting. At this time, the laser power for erasing is selected from the power which is able to crystallize the recording film when this power is continued to be radiated, and the power for recording is selected from the power which is able to bring the recording film under an amorphous state.

FIG. 14A and FIG. 14B show an example of the optical head 210 best suited to execute the present invention. In a conventional optical head, an actuator for driving an objective lens was provided for focal point control, but it was difficult to make the optical head thinner because of this actuator. In the optical head 210 of the present invention, the actuator for the objective lens 219 is deleted, and a relay lens 216 is provided instead and moved in a parallel direction with the disk, thereby to realize focal point control. Further, aberration on a disk is compensated in an ordinary objective lens by utilizing a plurality of lenses, but a part thereof is split and moved to the whole surface of a riser mirror 218 so as to make the optical head thinner.

The optical head 210 shown in FIG. 14A will be described. Luminous flux emitted from a semiconductor laser 211 passes through a collimator lens 212 and a shaping prism 213, and the luminous flux is reflected by a polarizing prism 214. The reflected luminous flux passes through a condenser lens 220 for detection, and is detected by an optical sensor 221. The luminous flux which has passed through the polarizing prism 214 passes through a λ/4 plate 215 and is converged appropriately by a relay lens 216 having a focus actuator 230, and then passes through an objective lens 217 and is reflected by a riser mirror 218, and is radiated onto the optical disk thereafter through an objective lens 219. The optical head 210 shown in FIG. 14B includes the optical sensor 221 provided with light permeability in place of the polarizing prism 214 and a relay lens 216 provided with no focus actuator 230.

Figure 15:
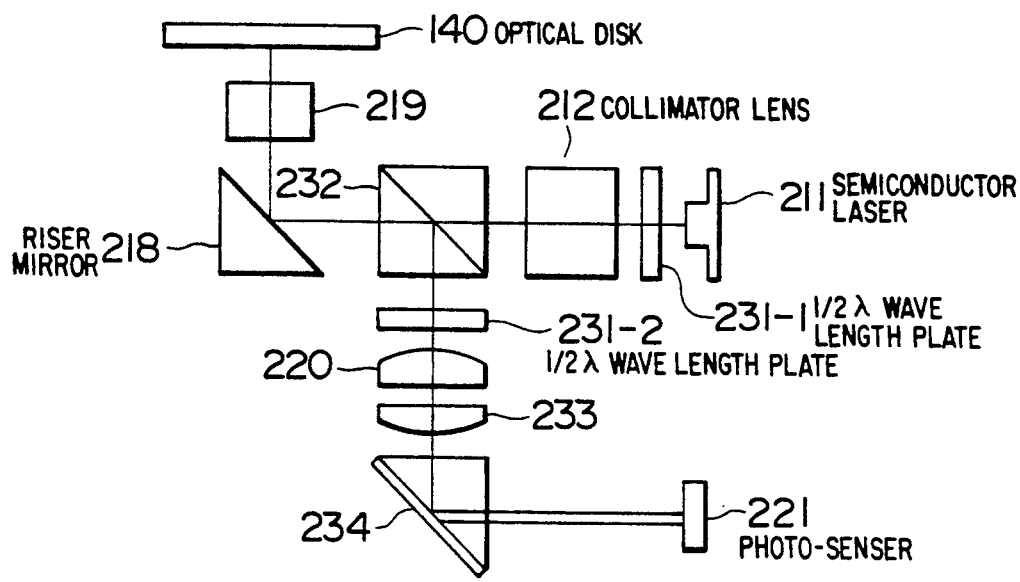
FIG. 15 is a diagram showing still another embodiment of the optical head for a magneto-optical disk.

In FIG. 2A, FIG. 2B, FIG. 2C, FIG. 2D and FIG. 3, the optical head 210 may be realized with the optical system shown in FIG. 15. A divergent luminous flux emitted from a semiconductor laser 211 passes through a beam splitter (hereafter abbreviated as BS) 232 through a λ/2 plate 231-1 and a collimator lens 212 and becomes parallel luminous fluxes. The parallel luminous fluxes are reflected further by the riser mirror 218, and converted thereafter into parallel fluxes again by the objective lens 219 and radiated onto the optical disk 140. On the other hand, the luminous flux passes through a λ/2 plate 231-2 after reflected by the BS 232, and is incident on a detection lens 220 consisting of a combination of a convex lens and a concave lens so as to become a convergent luminous flux. The convergent luminous flux is incident on a cylindrical lens 233, thus producing astigmatism. The luminous flux which has passed the cylindrical lens 233 is incident on a micro BPS 234 which is a analyzer. This micro BPS 234 is composed of a parallelogram prism and transparent parallel flat plates putting a polarizing film which transmits P-polarized light (polarized light in a vibration direction parallel with the paper surface) and reflects S-polarized light (polarized light in a vibration direction perpendicular to the paper surface) therebetween. The convergent luminous flux is incident on the polarizing film from the upper side of the parallelogram prism. The P-polarized light which has been transmitted through the polarizing film is totally reflected by the back plane of the parallel flat plates and passes through the polarizing film again, and then advances toward the left side of the parallelogram prism. On the other hand, the S-polarized light reflected by the polarizing film also advances in the same direction as the P-polarized light, and is incident on the optical sensor 221 at a certain interval. This interval is controlled by means of the parallel flat plates.

Figure 16:
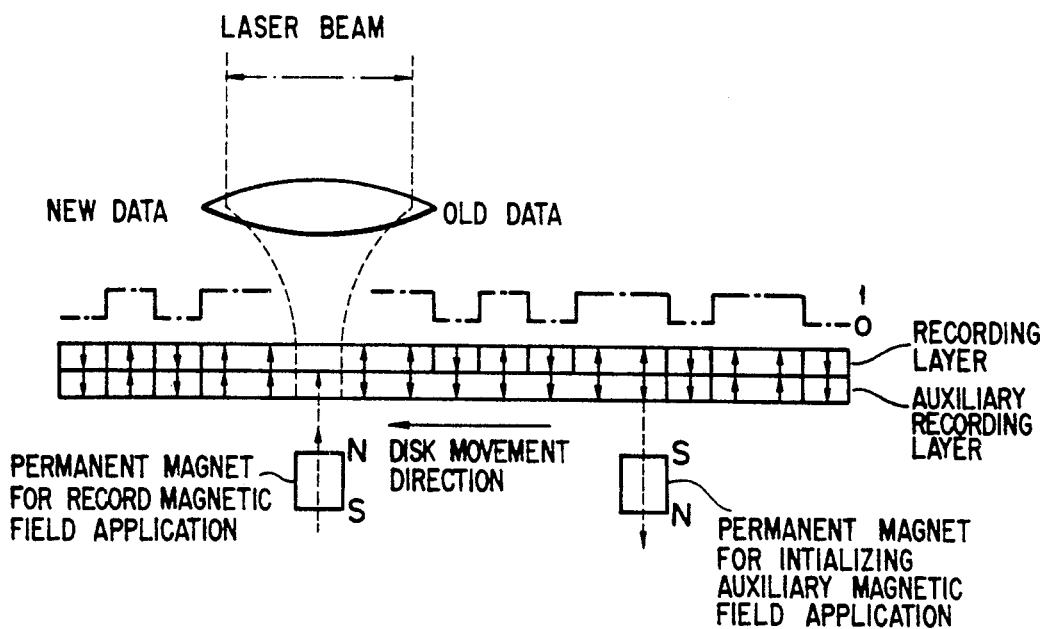
FIG. 16 is a diagram for explaining principles of initialization, write, read and overwrite of a mageneto-optical disk.

FIG. 16 shows the principle of overwriting a magneto-optical disk by laser power modulation. A write medium best suited for realizing the present invention will be explained with this principle. As shown in FIG. 6, the optical recording medium has a two-layer structure of the recording layer and the auxiliary recording layer, in which the recording layer on the side applied with a laser beam is composed of TbFe which has a large coercive force Hc and a low curie temperature and the auxiliary recording layer is composed of GdTbFe which has a small coercive force Hc and a high curie temperature. Besides, the permanent magnet for applying an initializing auxiliary magnetic field is made to generate a magnetic field stronger than that of the permanent magnet for applying a recording magnetic field. First, magnetization of the auxiliary recording layer having small Hc is oriented in a magnetizing direction in the permanent magnet for applying initializing auxiliary magnetic field. At this time, since the magnetization of the recording layer has a coercive force larger than that of the permanent magnet for applying the initializing auxiliary magnetic field, the magnetization direction is not reversed. When the recording medium reaches a position where the laser beam is applied under the abovementioned state, magnetization of the auxiliary recording layer having a high curie temperature is preserved as is and only the recording layer reaches the curie temperature and higher when the laser power is weak. Thus, the magnetization of the recording layer is oriented in the magnetizing direction of the auxiliary recording layer in the cooling process. On the other hand, since the auxiliary recording layer also reaches the curie temperature when the laser power is strong, the magnetization thereof is oriented in the direction of the magnetic field of the permanent magnet for applying a recording magnetic field along with the recording layer. That is, since the magnetizing direction is determined by the difference in the intensity of the laser power, viz., modulation of the laser power, a process of erasing old written contents becomes unnecessary, thus making overwriting possible. Due to such a principle, it is required that the permanent magnet for applying the recording magnetic field is positioned where the laser beam is applied. However, the permanent magnet for applying the initializing auxiliary magnetic field does not need to be placed at the positions shown in FIG. 2D and FIG. 3, but may be placed at any position in the case on the recording area of the magneto-optical disk which does not overlap with the permanent magnet for applying recording magnetic field.

The optical recording medium is not limited to a $Tb_{21}Fe_{79}$ recording layer and a $Gd_{24}Tb_3Fe_{73}$ auxiliary recording layer so far as a two-layer structure of a recording layer having a large coercive force Hc and a low curie temperature and an auxiliary recording layer having a small coercive force Hc and a high curie temperature is formed. Further, a composition of a GdTbFeCo recording layer, a GdFeCo intermediate layer and a TbFeCo auxiliary recording layer which is a two-layer lamination having a third magnetic layer intermediately as a means for reducing magnetic wall energy at the interface may be used as well.

Since the permanent magnet such as SmCo and NdFeB used as a second magnetic field application means for recording in the recording layer is not transparent with respect to the wavelength of incident light as seen from the principle of overwriting, it is required that the means for applying the magnetic field for recording in the recording layer is self-contained in a case on the opposite side of the light incident portion and the disk. In FIG. 2D and FIG. 3, the first magnetic field application means for initializing the auxiliary recording layer is shown to be self-contained in the case on the opposite side of the light incident portion and the disk, but the first magnetic field application means for initializing the auxiliary recording layer may be self-contained in the case on the light incident side.

Figure 17:
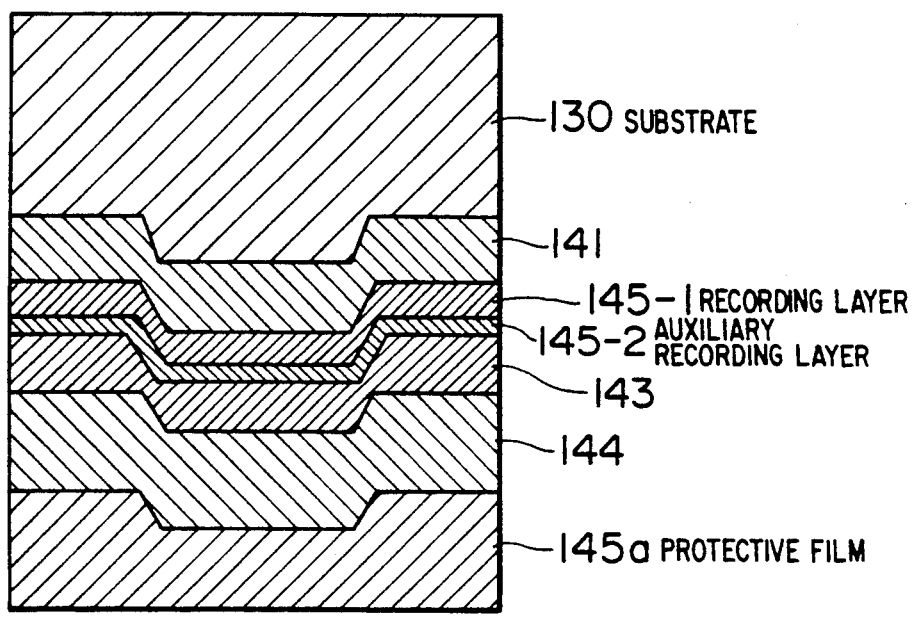
FIG. 17 and FIG. 18 are sectional views showing multilayer compositions of the magneto-optical disk.

FIG. 17 shows a film structure best suited to be used as a magneto-optical disk medium shown in FIG. 2D. The magneto-optical disk medium is composed of a light permeable substrate 130, a first light interference film 141 having a high refractive index characteristic, recording layer 145-1, an auxiliary recording layer 145-2, a second light interference film 143 having a high refractive index characteristic, a reflecting film 144 and a protective film 145a. In such an optical disk medium, light is incident from the substrate side. $Si_2N_{41}$, AlN, $Ta_2O_5$, ZnS and the like can be used as a dielectric film having a high refractive index. An example of a manufacturing method and performance will be shown. First, a first light interference film $Si_3N_4$ having a thickness of 100 nm, then a recording film $Tb_{20}Fwe_{80}$ having a thickness of 100 nm, an auxiliary recording film $Gd_{24}Tb_5Fe_{71}$ having a thickness of 50 nm, a second light interference film $Si_3N_4$ having a thickness of 100 nm and an Au reflecting film having a thickness of 100 nm have been formed by applying a sputtering method to a glass substrate having a thickness of 0.5 mm and a diameter of 48 mm on which a groove having a depth of 100 nm and a pitch of 1.6 μm is formed in a spiral form. Furthermore, ultraviolet hardening resin having a thickness of 100 μm has been formed as a protective film thereon. This magneto-optical disk was attached to the transparent case shown in FIG. 2D, that is, a polycarbonate substrate having a thickness of 0.6 mm obtained by cutting a SmCo magnet having Hc at 40,000 e as the first magnetic field application means for initializing the auxiliary recording layer and a SmCo magnet 5 mm wide and 25 mm long having Hc at 3,000 e as the second magnetic field application means for recording in the recording layer out of a bulk. The performance of such a magneto-optical disk-in-card has been evaluated. The disk-in-card was rotated at the rotation speed of 3,600 rpm and tested by the laser modulation method at the time of overwriting shown in FIG. 13. That is, when 6.6 mW was set on the write film surface as the bias power and 8.9 mW was set on the recording film surface as the recording power and overwrite test was executed while modulating the optical beam between 2 MHz and 3 MHz, C/N was obtained at 54 dB and the error generation factor was obtained at less than $10^{-5}$.

Figure 18:
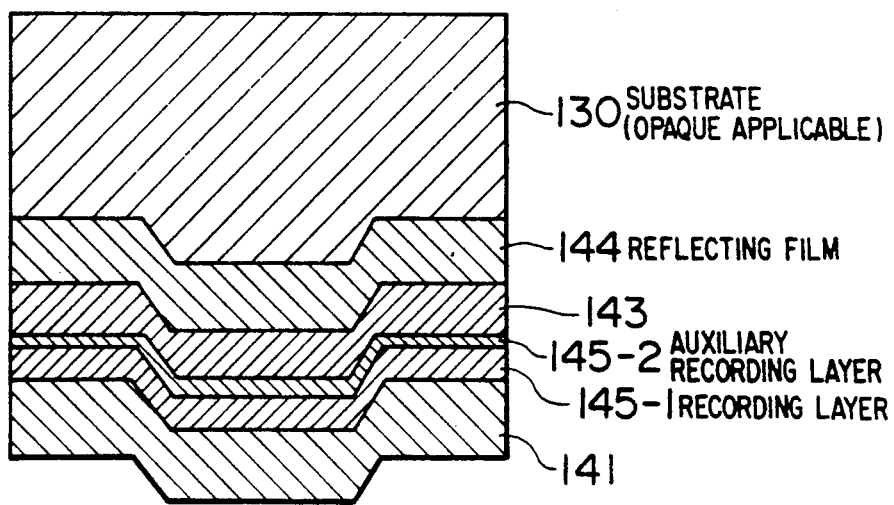

On the other hand, FIG. 18 shows a film structure best suited to be used as the magneto-optical disk medium shown in FIG. 3. In this case, a feature exists in that the order from the first light interference film 141 to the reflecting film 144 is reversed because the laser beam is incident from the protective film. Here, the interference film fulfils the functions of improvement of contrast by means of interference of light and the control film of heat conduction characteristic. Besides, in this case, since the light incident side is not on the substrate side, it is possible to form the same film composition as that shown in FIG. 18 on the opposite side of the substrate, thereby to use both sides of one sheet of substrate. An example of a manufacturing method and performance is shown. First, an Au reflecting film having a thickness of 100 nm, a second light interference film AlN having a thickness of 100 nm, an auxiliary recording layer $Tb_{24}Fe_{65}Co_{11}$ having a thickness of 100 nm, a recording film $Gd_{24}Tb_3Fe_{73}$ having a thickness of 50 nm and a first light interference film $Si_3N_4$ having a thickness of 100 nm have been formed by applying a sputtering method to a stainless steel substrate having 0.5 mm in thickness and 48 mm in diameter on which a groove having 100 nm in depth and 1.6 μm in pitch is formed in a spiral form. Furthermore, ultraviolet hardening resin having a thickness of 100 μm has been formed as a protective film thereon. This magneto-optical disk was attached to the transparent case shown in FIG. 3, that is, a polycarbonate substrate having a thickness of 0.6 mm obtained by cutting a SmCo magnet having Hc at 40,000 e as the first magnetic field application means for initializing the auxiliary recording layer and a SmCo magnet 5 mm wide and 25 mm long having Hc at 3,000 e as the second magnetic field application means for recording in the recording layer out of a bulk. The performance of such a magneto-optical disk-in-card has been evaluated. When the disk-in-card was rotated at the rotation speed of 3,600 rpm, 6.6 mW was set on the recording film surface as the bias power and 8.9 mW was set on the recording film surface as the write power and overwrite test was executed while modulating the optical beam between 2 MHz and 3 MHz, C/N was obtained at 54 dB and the error generation factor was obtained at less than 10.

Figure 19:
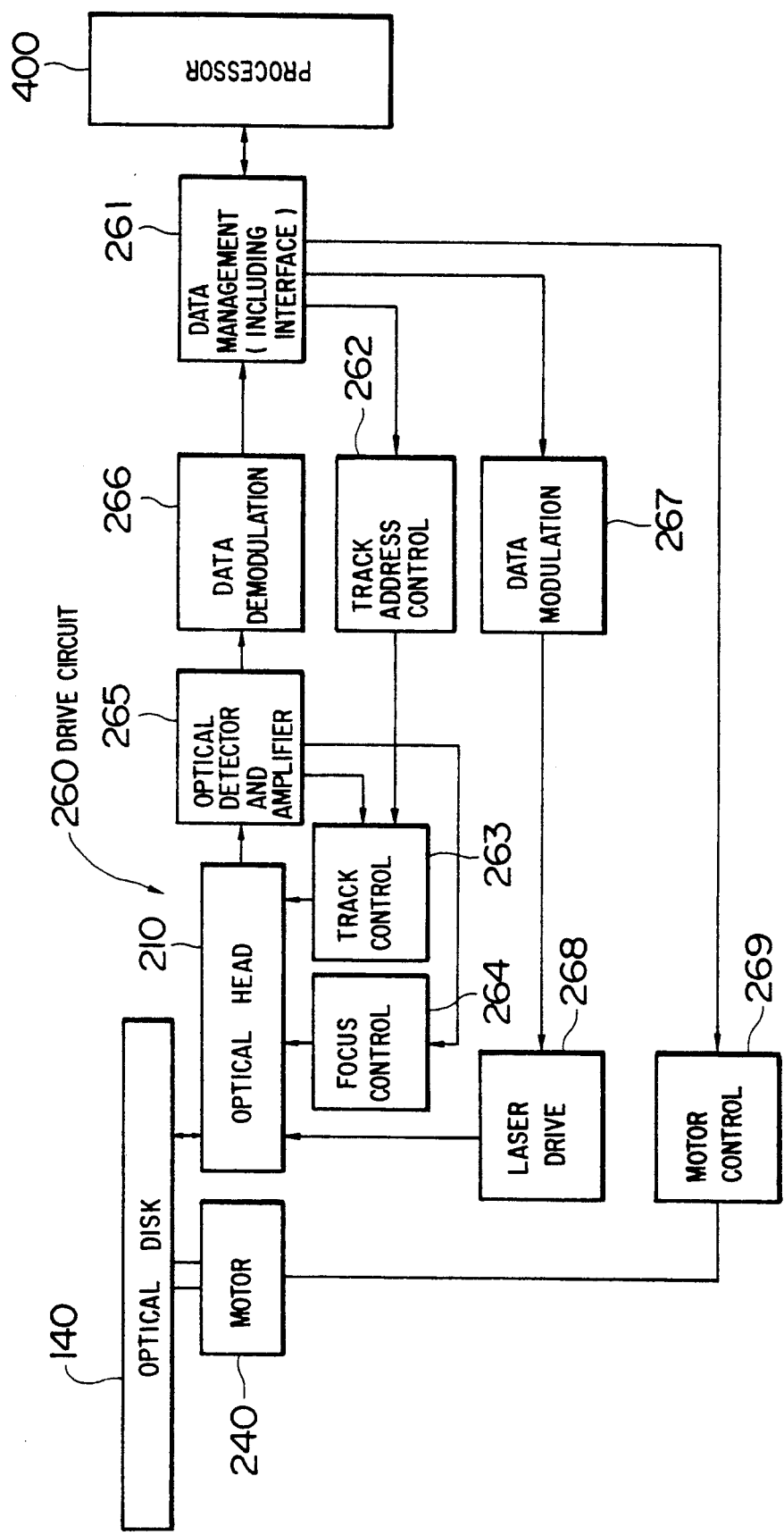
FIG. 19 is a block diagram showing an embodiment of a drive circuit system.

An optical disk drive circuit system 260 is explained in detail in FIG. 19. The optical disk drive circuit system 260 is composed of a data management portion 261, a track address control portion 262, a track control portion 263, a focus control portion 264, a photo detector and amplifier 265, a data demodulation portion 266, a data modulation portion 267, a laser drive 268 and a motor control portion 269. With such a composition, at the time of overwriting, a track address to be written is determined in the track address control portion 262, and the data modulation portion 267 converts the data given from a processor 400 into "0" and "1" pattern to be recorded on the optical disk by a modulation system. The modulation system includes 2–7 modulation and 4–15 modulation, which, however, are used properly depending on the system. In the laser drive 268, the laser power is modulated between the bias power and the writing power as shown in FIG. 13 in accordance with the "0" and "1" pattern determined by the data modulation portion 267. Further, at the time of reading data, a track address designated by the processor 400 is selected, the laser power is set at a constant value of approximately 1 to 2 mW, the reflectance of the optical disk or the karr rotation of the magneto-optical disk 140 is read by the photo detector and amplifier 265, and the data are demodulated by the data demodulation portion 266. Further, the result of the photo detector and amplifier 265 may be utilized as the signal of the track control portion 263 and the focus control portion 264, but the functions of these portions can be realized with the functions which have been heretofore employed in a compact disk and an optical disk device. Further, the motor control portion 269 controls the number of rotation of a motor 240 for rotating the optical disk 140. There are CAV (Constant Angular Velocity) type and CLV (Constant Linear Velocity) type systems for the control of the number of rotation.

In another embodiment of an optical or magneto-optical disk-in-card of the present invention, a means for rotating the disk is self-contained in the card. With this, it is possible to make the thickness of the whole information processor thinner by the portion of the motor.

Figure 20:
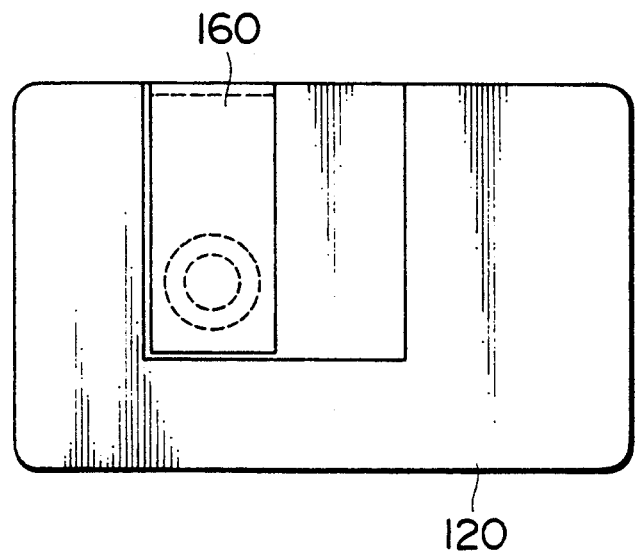
FIG. 20 is a plan view showing another mageneto-optical disk-in-card.

FIG. 20 shows another embodiment of the disk-in-card 100. The basic composition is the same as the composition shown in FIG. 4, and the light incident portion is covered with a transparent protective case, but the feature of the embodiment shown in FIG. 20 exists in that a protective cover 160 is provided. Since the disk-in-card 100 of the present invention is carried freely, the card case 120 is flawed sometimes. There is no problem even if other parts than the light incident portion are flawed, but the card case needs to be replaced sometimes if the light incident portion is flawed. It is an object of the present invention to reduce the frequency of replacement of the card case. That is, by providing the protective cover 160 on the card case 120, the light incident portion is prevented from being flawed, and incidence of light is made free by opening the protective cover 160 when the optical disk-in-card is inserted into the optical disk drive 200.

Figures 21A, 21B:
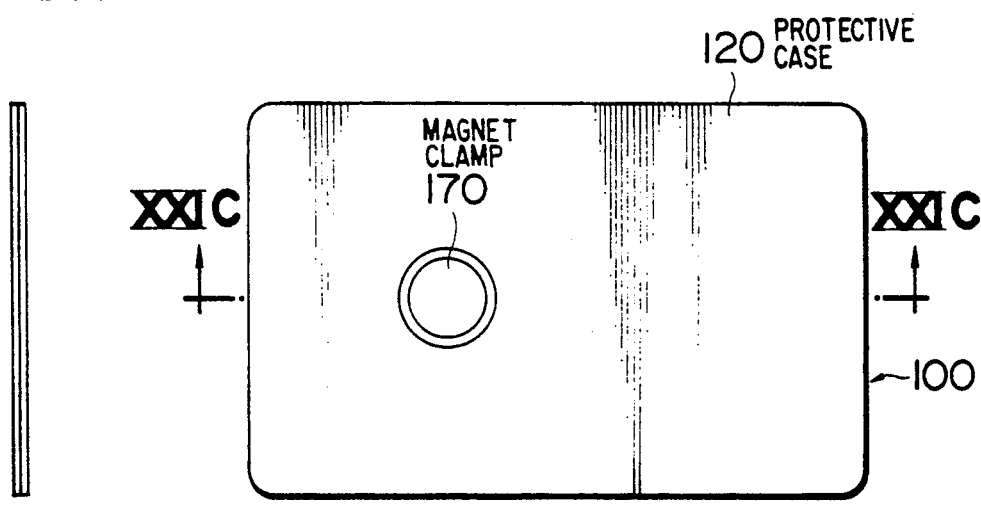
FIG. 21A is a plan view showing another embodiment of the optical disk-in-card.
FIG. 21B and FIG. 21C are respective side views of the optical disk-in-card shown in FIG. 21A.
Figure 21C:
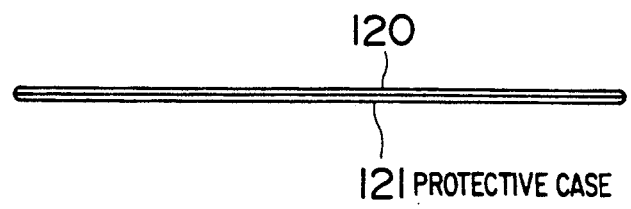
Figure 22A:
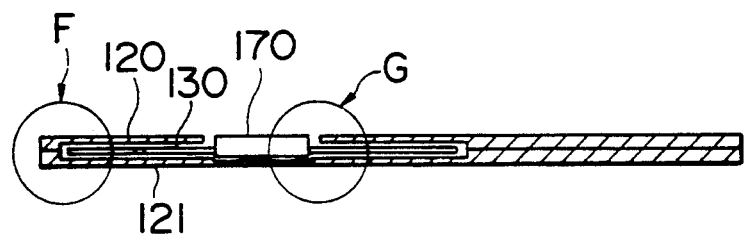
FIG. 22A is a sectional view of an optical disk-in-card taken along line XXIC—XXIC in FIG. 21A.
Figure 22B:
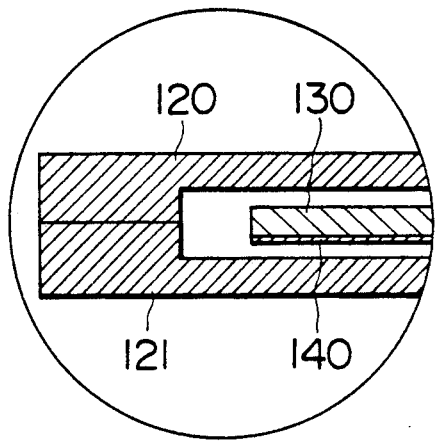
FIG. 22B is an enlarged sectional view of the area F in FIG. 22A.
Figure 22C:
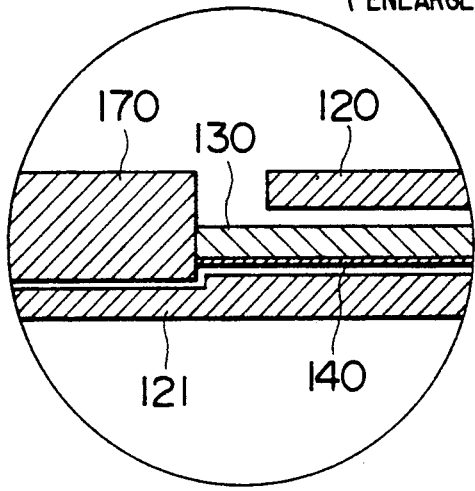
FIG. 22C is an enlarged sectional view of the area G in FIG. 22A.
Figure 23A:
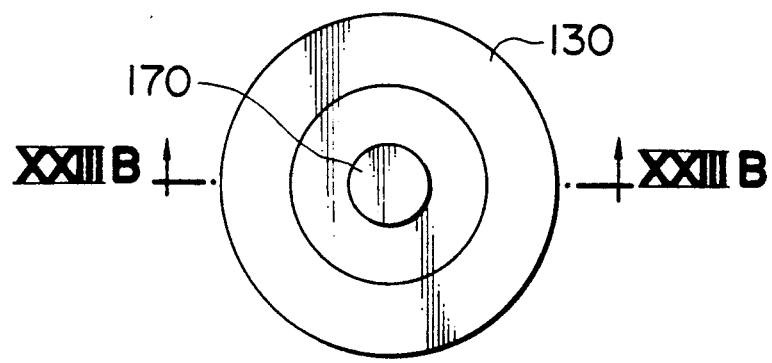
FIG. 23A is a plan view of another optical disk.
Figure 23B:
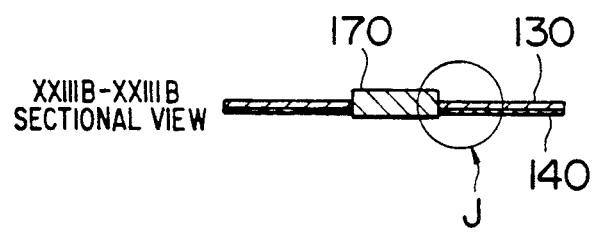
FIG. 23B is a sectional view taken along line XXIIIB—XXIIIB in FIG. 23A.

FIG. 21A, FIG. 21B and FIG. 21C show still another embodiment of the optical disk-in-card 100. Transparent protective plates 120 and 121 each have a film thickness of approximately 0.5 to 1.2 mm and the optical disk 140 (not shown) is inserted between these protective plates 120 and 121. Further, 170 indicates a magnet clamp for fixing the optical disk 140 to the rotary shaft for rotating the optical disk. FIG. 22A is a sectional view taken along lines XXIC—XXIC shown in FIG. 21A, and FIG. 22B and FIG. 22C are enlarged views of areas F and G shown in FIG. 22A. The optical disk 140 is fixed with the magnet clamp 170 and is apart from the protective plates 120 and 121. Under the state that the optical disk 140 is rotating, the optical disk 140 and the substrate 130 are under floating states from the protective plates 120 and 121. FIG. 23A and FIG. 23B show an example of the optical disk in this disk-in-card 100. The central part of the disk is hollow in the example shown in FIG. 5B, whereas the example shown in FIG. 23B has a feature that the disk is fixed with the magnet clamp 170 at the central part thereof.

Figure 24:
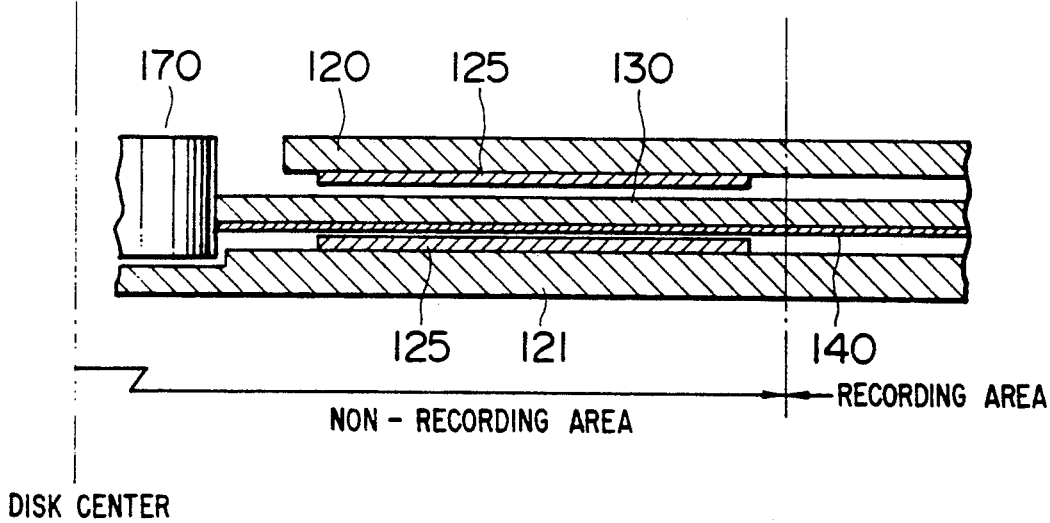
FIG. 24 and FIG. 25 are sectional views showing examples of countermeasures for preventing mixing of dust and dirt into recording areas of the optical disk.

FIG. 24 is an enlarged view of the area J in FIG. 23B and shows a preventive method against mixing of dust and dirt into the recording area. According to the present invention, the light incident portion is covered with a transparent protective cover. Therefore, dust and dirt will never get directly into the recording area, but the central part of the disk is open for the purpose of rotation, thus it is possible that dust and dirt mix in through this central part. Accordingly, in the present invention, a dust protective mat 125 is laid in a non-recording area so as to prevent mixing of dust and dirt from the central part of the disk. An example in which a magnet clamp is utilized was explained with reference to FIG. 24, however, it is a matter of course that this dust protective mat is applicable to the example shown in FIG. 2.

Figure 25:
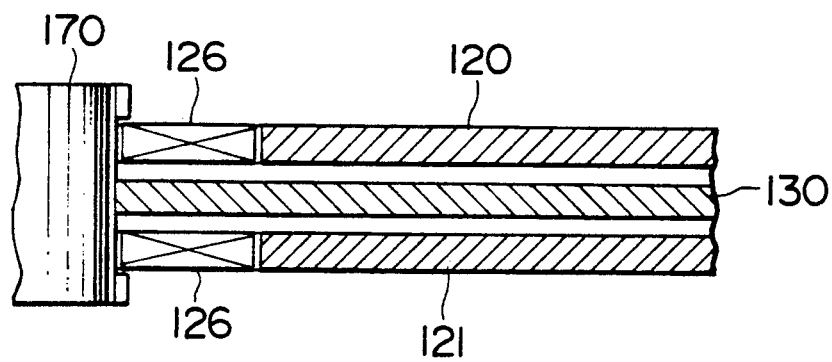

FIG. 25 shows another example of a counter-measure against dust corresponding to FIG. 24. In the example shown in FIG. 24, there was a fear that dust and dirt mix in because the central part of the disk was open. Whereas, the present embodiment has a feature that a bearing 126 is provided at the central part of the disk so as to delete the opened part.

Figure 26B:
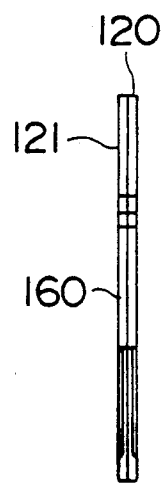
FIG. 26B thru FIG. 26D are respective side views of the optical disk-in-card shown in FIG. 26A.
Figure 26A:
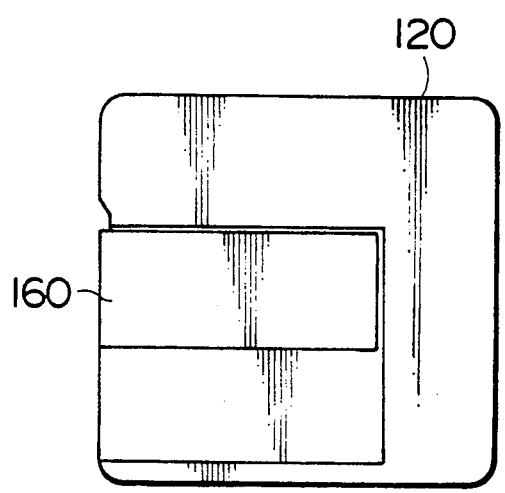
FIG. 26A is a plan view showing another embodiment of an optical disk-in-card.
Figure 26D:
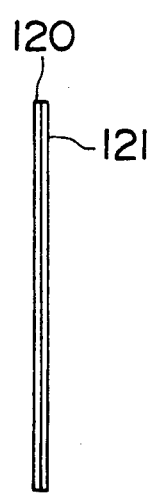
Figure 26C:
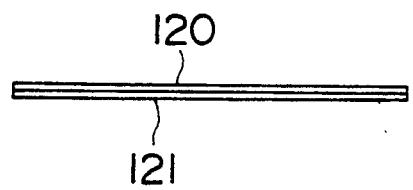

FIG. 26A, FIG. 26B, FIG. 26C and FIG. 26D show another embodiment related to the card configuration. In above-described embodiment, a case that the card configuration has an equivalent configuration to a credit card has been described, but any configuration may be applied so far as the size thereof may contain the optical disk. FIG. 26A shows an embodiment of a substantially square card having a protective cover 160. Besides, the size of the optical disk has been shown at approximately 50 mm in the present invention, but the size may be altered. That is, the present invention is applicable to any size such as 12 inches, 8 inches, 5.25 inches, 5 inches and 3.5 inches which have been heretofore developed.

FIG. 27 shows another embodiment of the magneto-optical disk-in-card 100 for realizing the present invention. The basic composition is the same as the composition shown in FIG. 2A and the light incident portion is covered with a transparent protective case, but the feature of the embodiment shown in FIG. 27 exists in that a protective cover 160 is further provided. Besides, the permanent magnet for initializing the auxiliary recording layer of the recording medium and the permanent magnet for recording in the recording layer are in the protective case. Since the magneto-optical disk-in-card 100 of the present invention is carried freely, the card 120 is flawed sometimes. There is no problem even if other parts that the light incident portion are flawed, but the card case needs to be replaced sometimes if the light incident portion is flawed. It is an object of the present invention to reduce the frequency of replacement of the card case. That is, by providing the protective cover 160 on the card case 120, it is prevented that the light incident portion is flawed, and incidence of light is made free by opening the protective cover 160 when the magneto-optical disk memory card is inserted into the optical disk drive 200.

Figure 29A:
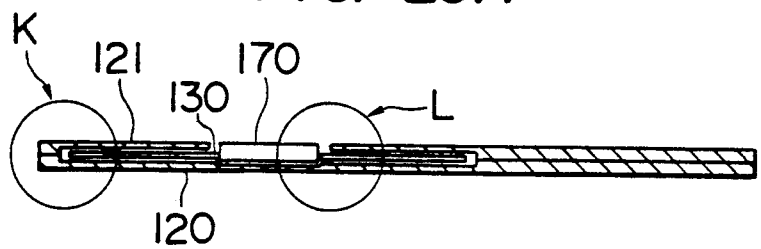
FIG. 29A is a sectional view taken along line XXVIIIC—XXVIIIC shown in FIG. 28A
Figure 29B:
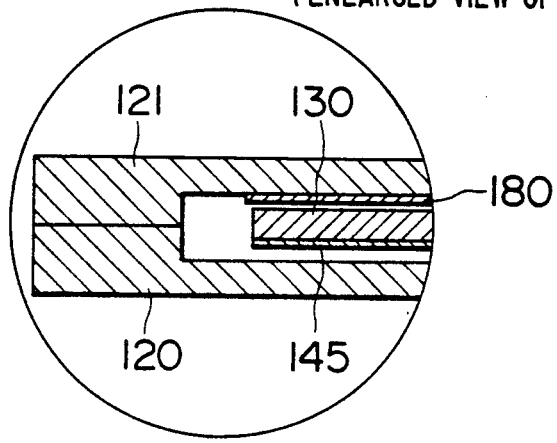
FIG. 29B is an enlarged sectional view of area K in FIG. 29A.
Figure 29C:
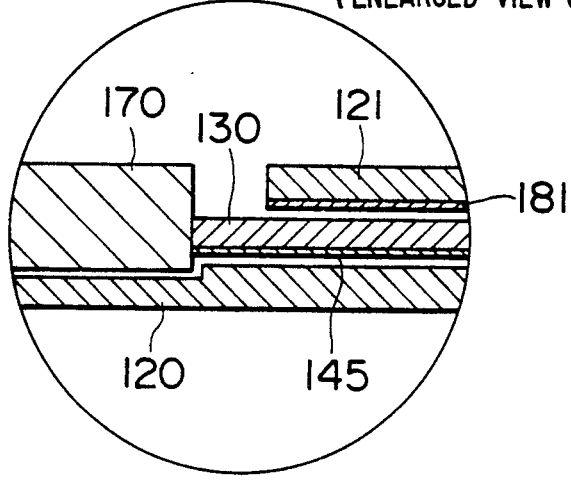
FIG. 29C is an enlarged sectional view of area L in FIG. 29A.

FIG. 28A, FIG. 28B and FIG. 28C show another embodiment of the magneto-optical disk-in-card 100. FIG. 28A shows the external appearance of a magneto-optical disk of a card size attached with the transparent protective case 120 and the protective case 121. The permanent magnet 181 for the initializing magnetic field and a permanent magnet 180 for the recording magnetic field are fitted to the protective case 121. The transparent protective cases 120 and 121 have a film thickness of approximately 0.5 to 1.2 mm, respectively, and the magneto-optical disk 140 (not shown) is inserted between these protective cases 120 and 121. Besides, 170 indicates the magnet clamp which fixes the magneto-optical disk 140 to a rotary shaft for rotation. FIG. 29A shows a sectional structure of the magneto-optical disk in FIG. 28A shown along line XXVIIIC—XXVIIIC. The magneto-optical disk 140 is fixed by the magnet clamp 170 and is apart from the protective case 120, 121. Further, FIG. 29B and FIG. 29C are enlarged views showing the areas K and L in FIG. 29A in more details. Under the state that the magneto-optical disk 140 is rotating, the magneto-optical disk 140 and the substrate 130 are under floating states from the protective case 120, 121. FIG. 30 shows another embodiment corresponding to FIG. 29C, which shows an example of a magneto-optical disk in the magneto-optical disk-in-card 100. The central part of the disk is hollow in the example shown in FIG. 5B, whereas the example shown in FIG. 30 has a feature that the disk is fixed with the magnet clamp 170 at the central part thereof.

FIG. 30 shows a preventive method against mixing of dust and dirt into the recording. According to the present invention, the light incident portion is covered with a transparent protective cover. Therefore, dust and dirt will never get directly into the recording area, but the central part of the disk is open for the purpose of rotation, thus it is possible that dust and dirt mix in through this central part. Accordingly, in the present invention, a dust protective mat 125 is laid in a non-recording area so as to prevent mixing of dust and dirt from the central part of the disk. An example in which a magnet clamp is utilized was explained with reference to FIG. 30, however, it is a matter of course that this dust protective mat is applicable to the examples shown in FIG. 2D and FIG. 3.

FIG. 31 shows another example of a countermeasure against dust. In the example shown in FIG. 30, there was a fear that dust and dirt mix in because the central part of the disk was open. Whereas, the present embodiment has a feature that a bearing 126 is provided at the central part of the disk so as to delete the opened part.

FIG. 32A, FIG. 32B, FIG. 32C and FIG. 32D show another embodiment related to the card configuration. In above-described embodiment, a case that the card configuration has an equivalent configuration to a credit card has been described, but any configuration may be applied so far as the size thereof may contain the magneto-optical disk. FIG. 32A shows an embodiment of a substantially square card. Besides, the size of the optical disk has been shown at approximately 50 mm in the present invention, but the size may be altered. That is, the present invention is applicable to any size such as 12 inches, 8 inches, 5.25 inches, 5 inches and 3.5 inches which have been heretofore developed.

Figure 33:
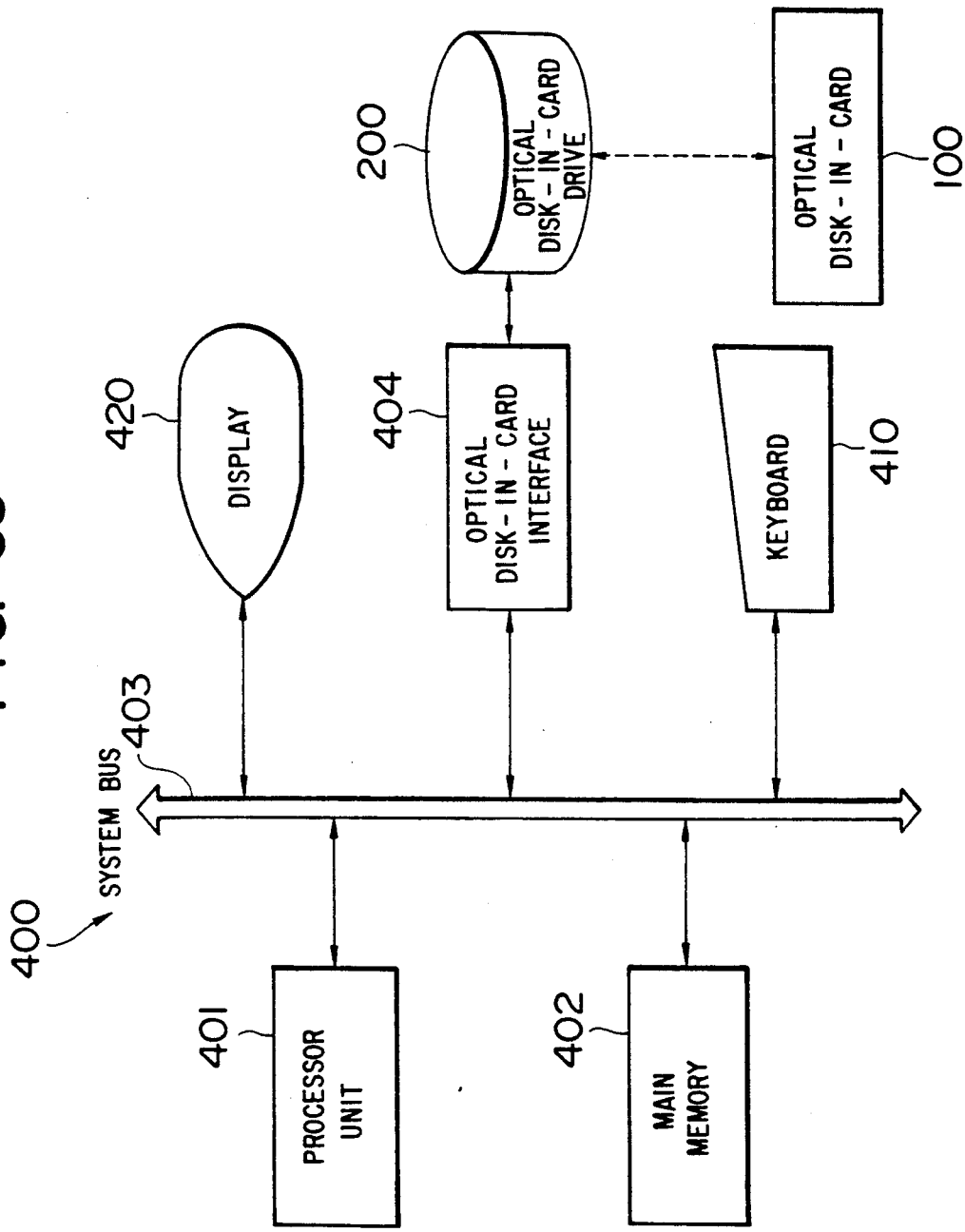
FIG. 33 is a block diagram showing the optical disk-in-card as applied to a lap top computer.

FIG. 33 shows an embodiment in case the present invention is applied to a lap top computer. This embodiment is composed of a lap top computer 400 including a processor unit 401 and a semiconductor main memory 402, and a keyboard 410 and a display 420 are connected thereto through a system bus 403, but the feature of the present invention exists in that an optical or magneto-optical disk-in-card drive 200 is connected through an optical or magneto-optical disk-in-card interface 404. The optical or magneto-optical disk-in-card 100 of the present invention has a capacity of more than 10 MB in spite of the small size having the overall size of approximately 50 mm. With this, large-scale arithmetic processing of a minicomputer is made possible though it is a lap top computer. Further, it is detachable from the optical or magneto-optical disk-in-card drive 200, thus providing a system convenient for transportation.

Figure 34:
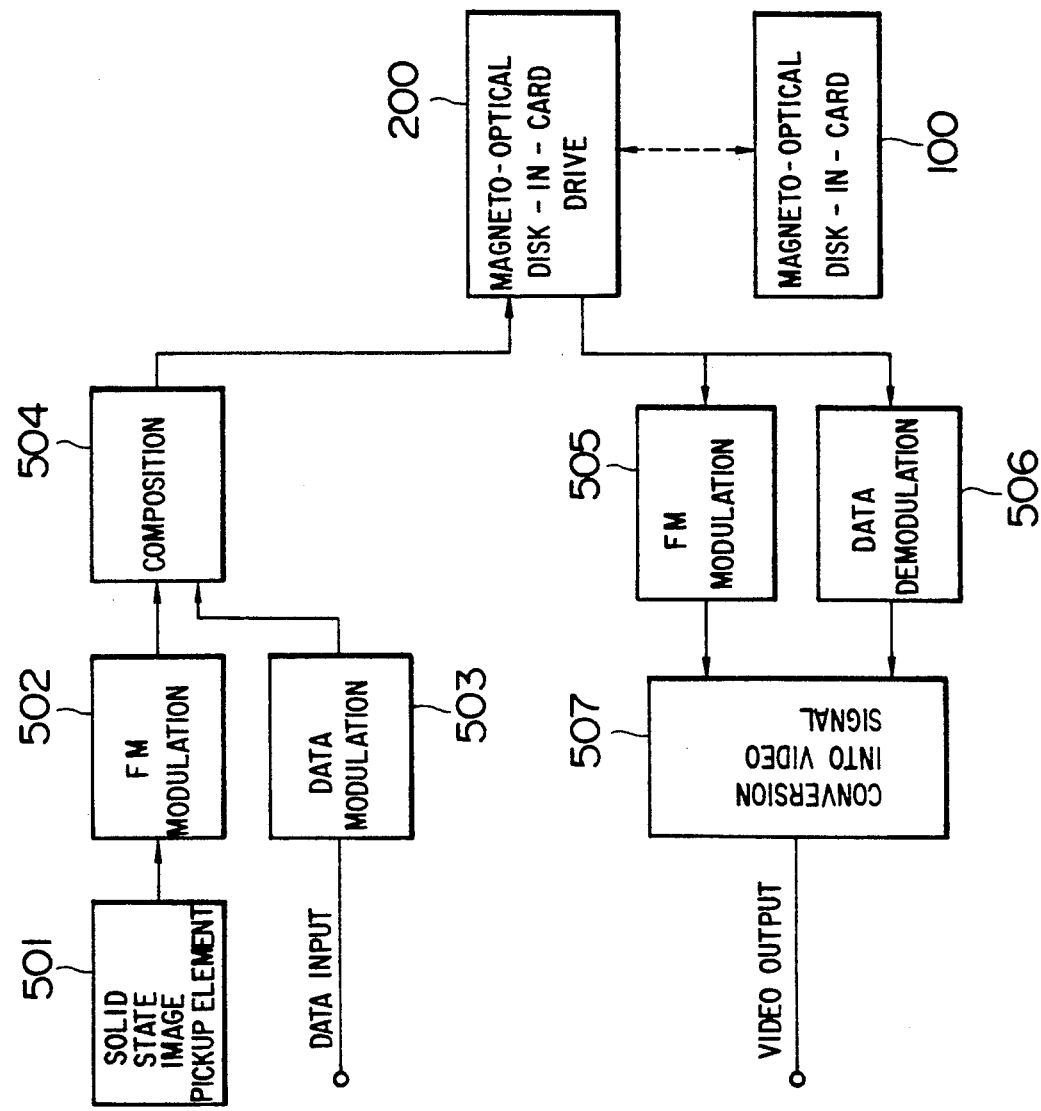
FIG. 34 is a block diagram showing the optical disk-in-card as applied to a camera.

FIG. 34 shows an embodiment when the present invention is applied to a camera. Signal processing of an electronic camera utilizing a floppy disk can be utilized for basic signal processing thereof. Signal processing of an electronic camera consists of an FM modulation element of a picture image, a modulation element of data such as data, a recording portion into a floppy disk and a video signal read portion as described in the Nikkei Electronics, Dec. 12, 1988, pp. 195-201. The feature of the present invention exists in that the optical or magneto-optical disk-in-card 100 is utilized as the recording medium of a signal. The optical or magneto-optical disk-in-card 100 of the present invention not only has a large capacity, but also is easy for handling and highly reliable because the optical disk is self-contained in a transparent protective case.

Concrete operation will be explained with reference to FIG. 34. In the figure, an electric signal converted photoelectrically by a solid state image pickup element 501 of a CCD or a MOS is FM-modulated. On the other hand, the data are converted by a differential phase shift keying (DPSK) system and the like, synthesized with FM modulation (block 502) and recorded in the optical or magneto-optical disk-in-card 100 through the optical or magneto-optical disk-in-card drive 200. On the other hand, at the time of reading, the picture image is demodulated by an FM demodulator 505 and the data are demodulated by a data demodulator 506, and both are converted into video signals such as NTSC by means of a converter 507 into video signals.

Figure 35:
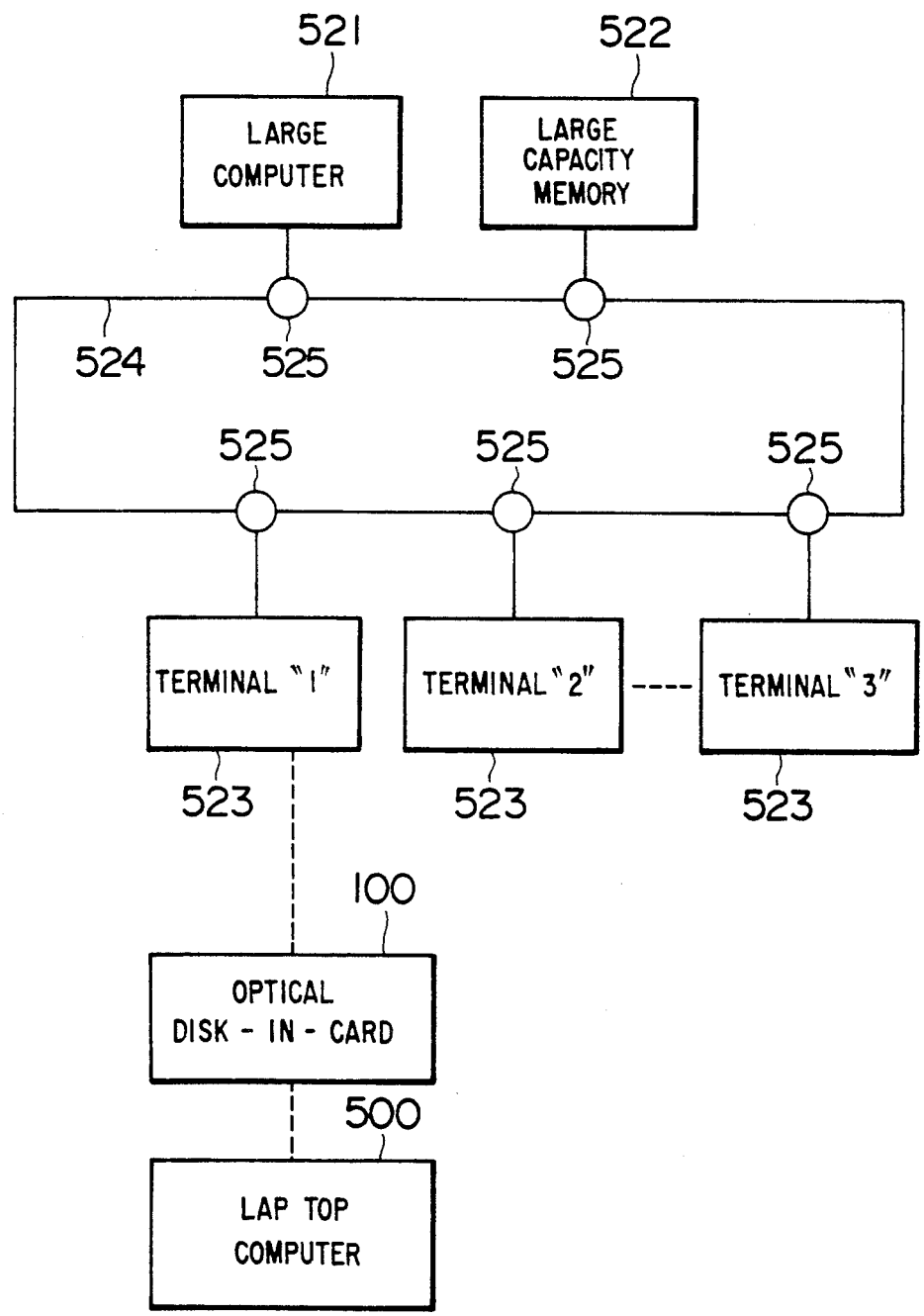
FIG. 35 is a block diagram showing the optical disk-in-card applied as a memory for a terminal of a large computer and an interface of a lap top computer.

FIG. 35 shows an example in which the optical or magneto-optical disk-in-card 100 is utilized as an interface between a lap top computer 500 and a terminal 523 of a large computer 521. In the figure, the large computer 521 has a memory 522 of a large capacity such as an ordinary magnetic disk, and is connected with a plurality of terminals 523 through a network 524 and stations 525 for utilization. However, there has been a problem that such a system cannot be utilized where there is no terminal. According to the present invention which has been made to solve such a problem, an optical or magneto-optical disk-in-card 100 of the present invention is used in a lap top computer 500 and the optical or magneto-optical disk-in-card 100 of the present invention is also used as a memory of the terminal 523 of the large computer. By using the optical or magneto-optical disk-in-card 100 in common as the memory of the lap top computer 500 and the terminal 523 of the large computer in a manner as described above, it is possible to proceed with the task of creating a program and debugging at home or in an electric car where the terminal is not available.

Figure 36:
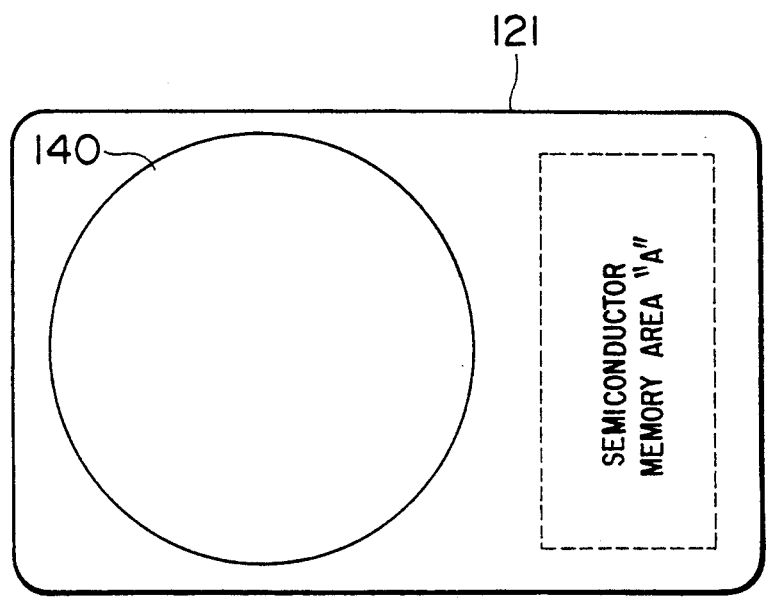
FIG. 36 is a plan view showing another embodiment of the optical disk-in-card.

FIG. 36 shows an application example of the optical or magneto-optical disk-in-card 100 when security is demanded of the memory. Although the optical or magneto-optical disk 140 has a feature of a large capacity, it is possible to check what type of pattern has been written with a microscope having a high enlargement ratio. It is not only possible to ensure security by utilizing a random number code and the like, but also to ensure higher security by providing a semiconductor memory on the card. In this case, it can be achieved by providing a semiconductor memory area "A" as shown in FIG. 36. If high security can be achieved as described above, this optical or magneto-optical disk memory card 100 can realize cash cards and information requiring secrecy such as a portable personal medical medium data base. In this case, it can be materialized with the hardware composition shown in FIG. 1.

Figure 37:
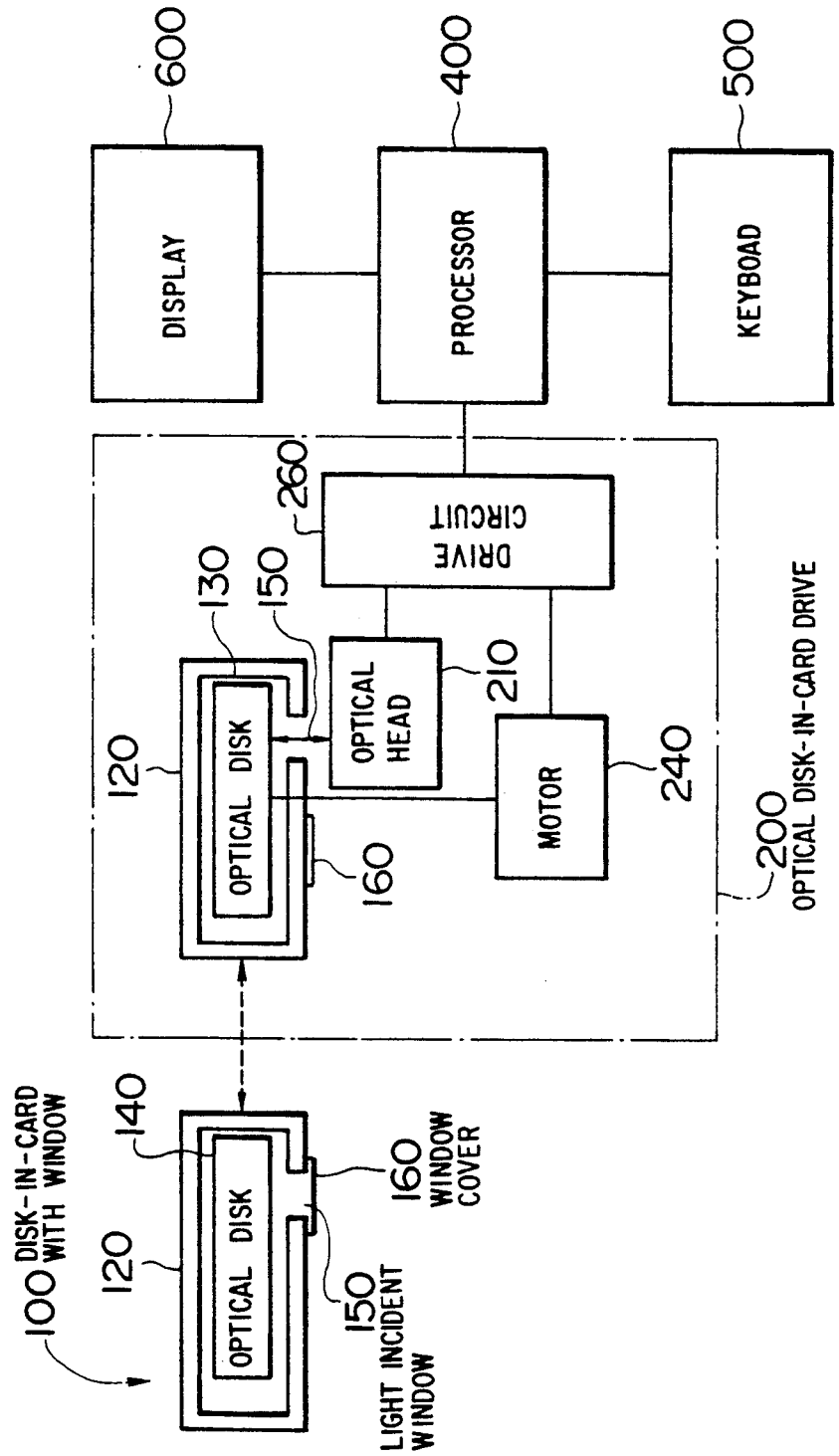
FIG. 37 is a block diagram showing another device according to the present invention.

An embodiment of the present invention will be explained hereafter with reference to FIG. 37. FIG. 37 shows a conceptual diagram of an optical or magneto-optical disk-in-card memory of the present invention. The optical or magneto-optical disk memory of the present invention is composed of an optical or magneto-optical disk 100 in 50 mmφ incorporated in a protective case of a card size, a disk drive 200 for the optical or magneto-optical disk-in-card, a processor 400, and input means 500 and an output means 600. The optical or magneto-optical disk-in-card 100 is composed of an optical disk 140, a light incident window 150, a card case 120 and a window cover 160, and is detachable from a disk drive 200. Further, the disk drive 200 is composed of a write/read/erase optical head 210, a motor 240 for rotating the optical disk 140 and a drive circuit 260 for controlling the optical head 210 and the motor 240, and the light incident cover 150 is opened automatically so that light may be incident when the optical or magneto-optical disk-in-card 100 is set. The drive circuit 260 controls the number of rotations of the motor 240 and also fulfils the functions of modulation and demodulation for reading of write/erase data by the command from the processor 400. Further, the processor 400 executes arithmetic processing or write/read to the optical disk in accordance with the command from the input means 500, and also outputs the contents of the memory of the optical disk 140 or operation results through the output means 600 as occasion demands.

Figure 38:
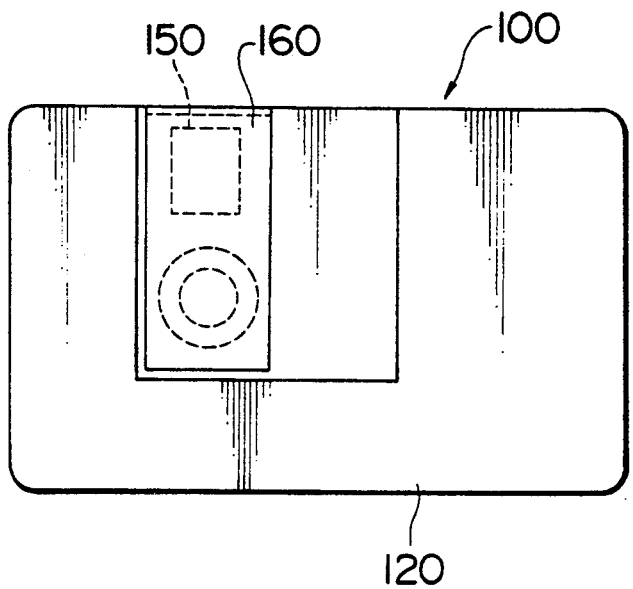
FIG. 38 is a plan view showing another embodiment of the optical disk-in-card.
Figure 39A:
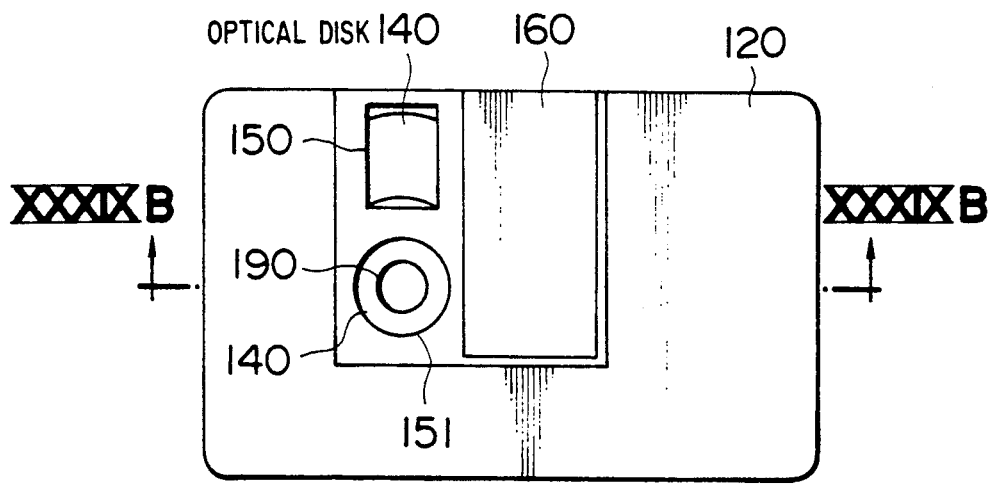
FIG. 39A is a plan view showing still another embodiment of the optical disk-in-card.
Figure 39B:
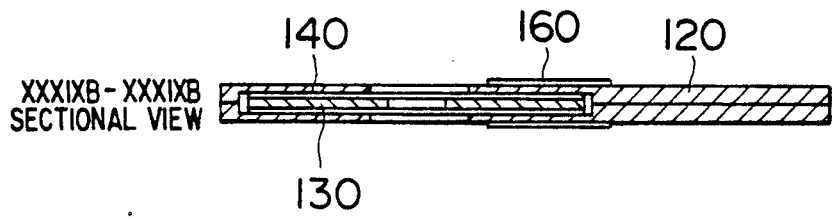
FIG. 39B is a sectional view taken along line XXXIXB—XXXIXB in FIG. 39A.

FIG. 38 shows an embodiment of optical disk-in-card 100 best suited for realizing the present invention. As shown in the figure, the optical disk medium 140 is incorporated in a protective case 120, 121 of a card size in the present optical disk-in-card 100. Further, in the protective cases, a window 150 is provided for another incidence of light, and the optical disk is usually covered with a cover 160. Here, when the optical disk-in-card 100 is set to the drive 200, the window cover 160 of the protective case is opened and light is made incident directly on the substrate of the optical disk, and a magnetic field generating means is used while allowing it to come near to the optical disk in the case of a magneto-optical disk. FIG. 39A and FIG. 39B show an external appearance of the optical disk-in-card 100 when the window cover 160 is opened. When the window cover 160 is opened, the optical disk 140 is exposed, and the optical head is able to make access directly to the optical disk.

Figure 40B:
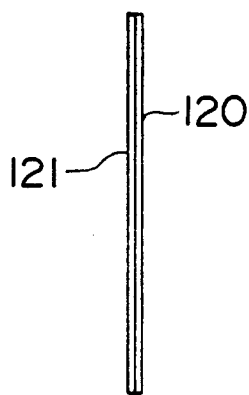
FIG. 40B and FIG. 40C are respective side views of the optical disk-in-card shown in FIG. 40A.
Figure 40A:
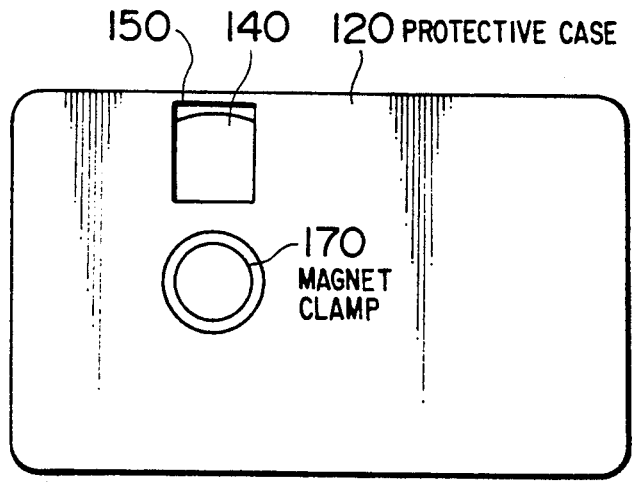
FIG. 40A is a plan view showing another embodiment of the optical disk-in-card.
Figure 40C:
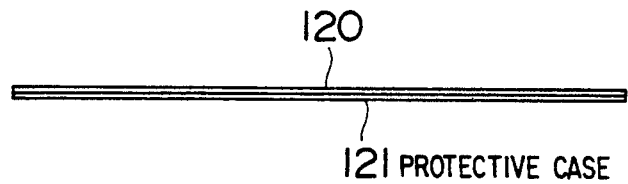

FIG. 40A, FIG. 40B and FIG. 40C show an embodiment in which the optical disk memory is rotated by means of a magnet clamp. For further details, this embodiment is similar to that shown in FIG. 21A.

Figure 41:
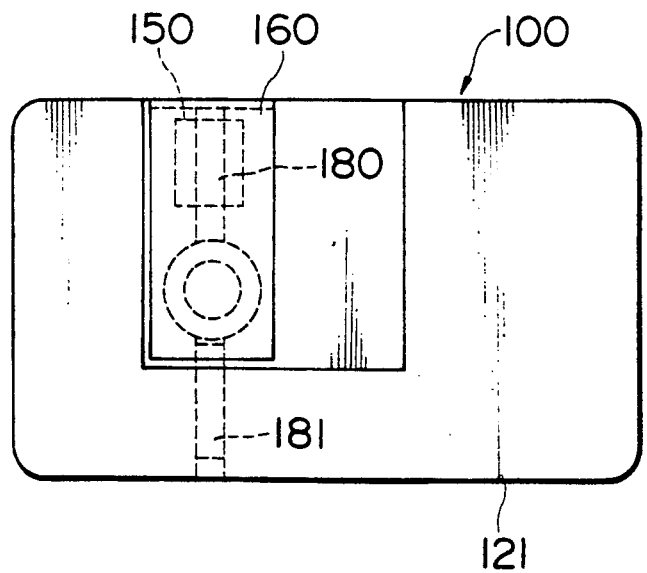
FIG. 41 is a plan view showing another embodiment of the optical disk-in-card.
Figure 42A:
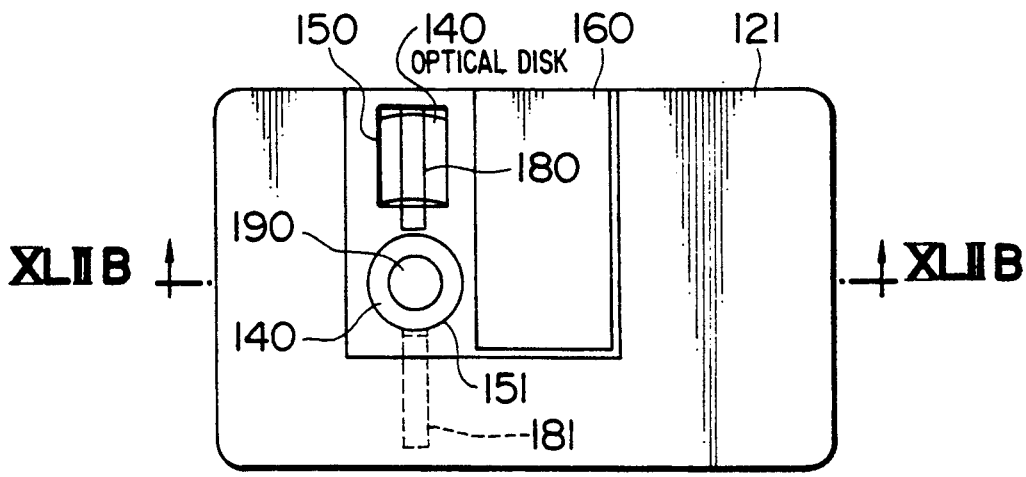
FIG. 42A is a plan view showing still another embodiment of the optical disk-in-card.
Figure 42B:
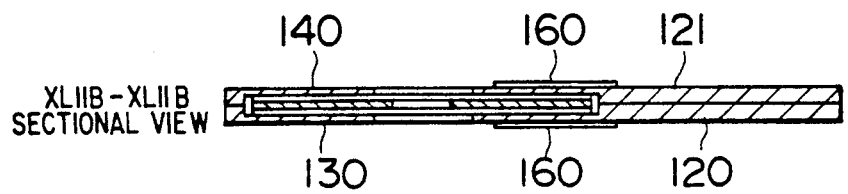
FIG. 42B is a sectional view taken along line XLIIB—XLIIB in FIG. 42A.

FIG. 41 shows an embodiment of the magneto-optical disk-in-card 100 best suited realizing the present invention. As shown in the figure, in the present magneto-optical disk-in-card 100, the optical disk medium 140 is incorporated in the protective case 120, 121 of a card size. Further, a window 150 is provided in the protective case for another incidence of light, and the optical disk is usually covered with a window cover 160. Here, when the optical disk-in-card 100 is set to the drive 200, the window cover 160 of the protective case is opened and light is made incident directly to the substrate of the optical disk, and a magnetic field generating means is used while allowing it to come near to the optical disk in the case of a magneto-optical disk. FIG. 42A and FIG. 42B show an external appearance of the optical disk-in-card 100 when the window cover 160 is opened. When the window cover 160 is opened, the optical disk 140 is exposed, and the optical head is able to make access directly to the optical disk.

Figure 43B:
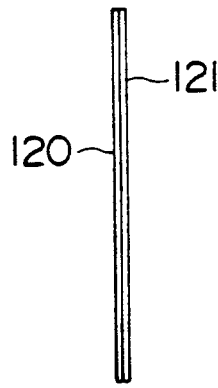
FIG. 43B and FIG. 43C are respective side views of the magneto-optical disk-in-card shown in FIG. 43A.
Figure 43A:
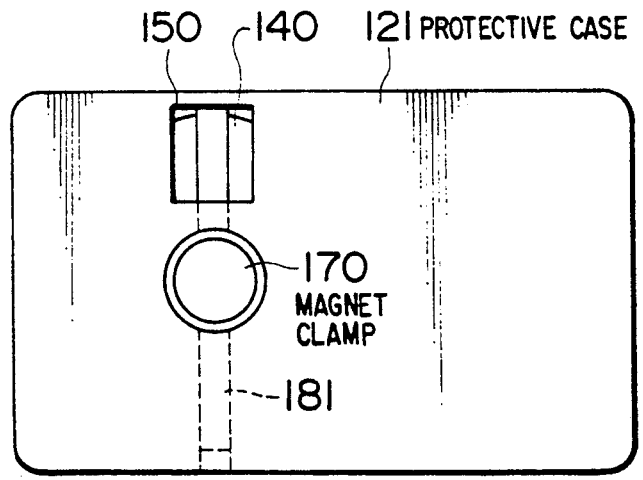
FIG. 43A is a plan view showing another embodiment of the optical disk-in-card.
Figure 43C:
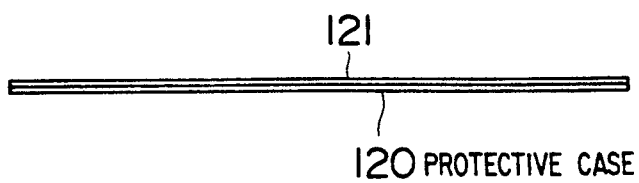

FIG. 43A, FIG. 43B and FIG. 43C show an embodiment in which the optical disk memory of FIG. 23 is rotated by means of a magnet clamp. For further details, this embodiment is similar to that shown in FIG. 28A.

We claim:

1. An information processor, comprising:
a disk memory including a disk, having a recording medium layer having concentrically formed track grooves for optically recording, erasing, and/or reproducing information and a transparent disk substrate through which said recording medium layer is optically irradiated, which disk is at most 3.5 inches in diameter, a case in which said disk is mounted so as to form a narrow gap between a surface of the disk and an inside surface of the case for maintaining the disk substantially in parallel therebetween and limiting the disk against a rotation fluctuation in the vertical direction, and means for rotatably supporting the disk in the case;
an optical head having an objective lens arranged on the side of said disk opposite said recording medium layer at a distance from said case so as to be untouched by the transparent disk substrate and the case, and such that the distance between the transparent disk substrate and the objective lens becomes no more than the sum of substantially twice the narrow gap and the thickness of the case, for recording, erasing and/or reproducing information into/from the recording medium layer through the transparent disk substrate;
rotation means for rotating the disk;
a drive circuit for controlling the operation of the optical head and the rotation of the rotation means;
a processor for supplying instructions to the drive circuit;
input means for inputting information into the processor; and
output means for outputting information from the processor.

2. An optical information recording/reproducing apparatus, comprising:
a disk memory including a disk having a recording medium layer having concentrically formed track grooves for optically recording, erasing, and/or reproducing information and a transparent disk substrate of at most 3.5 inches in diameter through which said recording medium layer is optically irradiate, a case in which said disk is mounted so as to form a narrow gap between a surface of the disk and an inside surface of the case, for maintaining the disk substantially in parallel therebetween and limiting the disk against a rotation fluctuation in the vertical direction, and a means for rotatably supporting the disk in the case;
an optical head having an objective lens arranged on the side of said disk opposite said recording medium layer at a distance from said case so as to be untouched by the transparent disk substrate and the case, and such that the distance between the transparent disk substrate and the objective lens becomes no more than the sum of substantially twice the narrow gap and the thickness of the case, for recording, erasing and/or reproducing information into/from the recording medium layer through the transparent disk substrate; and
rotation means for rotating the disk.

3. An optical information recording/reproducing apparatus, comprising:

a disk memory including a disk having are recording medium layer having concentrically formed track grooves for optically recording, erasing, and/or reproducing information and a transparent disk substrate of at most 3.5 inches in diameter through which said recording medium layer is optically irradiated, a case in which said disk is mounted with a narrow gap and provided with a dust-proof mattress between a surface of the disk and an inside surface of the case, for maintaining the disk substantially in parallel therbetween and limiting the disk against rotation fluctuation in the vertical direction, and means for rotatably supporting the disk in the case;

an optical head having an objective lens arranged on the side of said disk opposite said recording medium layer at a distance from said case so as to be untouched by the transparent disk substrate and the case, and such that the distance between the transparent disk substrate and the objective lens becomes no more than the sum of substantially twice the narrow gap and the thickness of the case, for recording, erasing and/or reproducing information into;/from the recording medium layer through the transparent disk substrate; and rotation means for rotating the disk.

4. An optical information recording/reproducing apparatus, comprising:

a disk memory including a disk having a recording medium layer having concentrically formed track grooves for optically recording, erasing and/or reproducing information and a transparent disk substrate through which said recording medium layer is optically irradiated;

a case having a credit card size in which said disk is mounted so as to form a narrow gap between a surface of the disk and an inside surface of the case, for maintaining the disk substantially in parallel therebetween and limiting the disk against a rotation fluctuation in the vertical direction, and means for rotatably supporting the disk in the case;

an optical head having an objective lens arranged on the side of said disk opposite said recording medium layer at a distance form said case so as to be untouched by the transparent disk substrate and the case, and such that the distance between the transparent disk substrate and the objective lens becomes no more than the sum of substantially twice the narrow gap and the thickness of the case, for recording, erasing and/or reproducing information into/from the recording medium layer through the transparent disk substrate; and rotation means for rotating the disk.

5. An optical information recording/;reproducing apparatus, comprising:

an optical magnetic disk memory including an optical magnetic disk having a recording medium layer and a recording auxiliary layer each having concentrically formed track grooves for optically recording, erasing and/or reproducing information and a transparent disk substrate of at most 3.5 inches in diameter through which said recording medium layer is optically irradiated, a case in which said disk is mounted so as to form a narrow gap between a surface of the disk and an inside surface of the case, for maintaining the optical magnetic disk substantially in parallel therebetween and limiting the optical magnetic disk against a rotation fluctuation in the vertical direction, and means for rotatably supporting the optical magnetic disk in the case;

an optical head having an objective lens arranged on the side of said disk opposite said recording medium layer at a distance form said case so as to be untouched by the transparent disk substrate and the case, and such that the distance between the transparent disk substrate and the objective lens becomes no more than the sum of substantially twice of the narrow gap and the thickness of the case, for recording, erasing and/or reproducing information into/from the recording medium layer through the transparent disk substrate; and rotation means for rotating the optical magnetic disk.

6. An optical information recording/reproducing apparatus, comprising:

an optical disk memory including an optical disk having a recording medium layer having concentrically formed track grooves for optically recording, erasing, and/or reproducing information on the basis of crystal structure phase transition resulting from optical irradiation and a transparent disk substrate of at most 3.5 inches in diameter through which said recording medium layer is optically irradiated, a case in which said disk is mounted so as to form a narrow gap between a surface of the disk and an inside surface of the case, for maintaining the optical disk substantially in parallel therebetween and limiting the optical disk against rotation fluctuation the vertical direction, and means for rotatably supporting the optical disk in the case;

an optical head having an objective lens arranged on the said of said disk opposite said recording medium layer at a distance from said case so as to be untouched by the transparent disk substrate and the case, and such that the distance between the transparent disk substrate and the objective lens becomes no more than the sum of substantially twice then arrow gap and thickness of the case, for recording, erasing and/or reproducing information into/from the recording medium layer through the transparent disk substrate; and rotation means for rotating the optical disk.

7. An optical information recording/reproducing apparatus, comprising:

a disk memory including a disk having a recording medium layer having concentrically formed track grooves for optically recording, erasing, and/or reproducing information and a disk substrate of at most 3.5 inches in diameter, permeable to the light irradiated on the recording medium layer and through which said recording medium layer is optically irradiated, a case in which said disk is mounted so as to form a narrow gap between a surface of the disk and an inside surface of the case, for maintaining the disk substantially in parallel therebetween and limiting the disk against rotation fluctuation in the vertical direction, and means for rotatably supporting the disk in the case;

an optical head having an objective lens arranged on the side of said disk opposite said recording medium layer at a distance from said case so as to be untouched by the disk substrate and the case, and such that the distance between the disk substrate and the objective lens becomes no more than the sum of substantially twice the narrow gap and the thickness of the case, for recording erasing and/or reproducing information into/from the recording medium layer through the disk substrate; and rotation means for rotating the disk.

8. An optical information recording/reproducing apparatus, comprising:
- a disk memory device including a disk having a recording medium layer having concentrically formed track grooves for optically recording, erasing, and/or reproducing information and a transparent disk substrate of at most 3.5 inches in diameter through which said recording medium layer is optically irradiated, a case in which said disk is mounted so as to form a narrow gap between a surface of the disk and an inside surface of the case, for mataining the disk substantially in parallel therebetween and limiting the disk against rotation fluctuation in the vertical direction, and means for rotatably supporting the disk in the case, the sum of the transparent disk substrate thickness and the thickness of a light incident portion of the case being no more than 1.2 mm;
- an optical had having a objective lens arranged on the side of said disk opposite said recording medium layer at a distance from said case so as to be untouched by the transparent disk substrate and the case, and such that the distance between the transparent disk substrate and the objective lens becomes no more than the sum of substantially twice the narrow gap and the thickness of the case, for recording, erasing and/or reproducing information into/from the recording medium layer through the transparent disk substrate; and
- rotation means for rotating the disk.

9. An optical information recording/reproducing apparatus according to claim 8, wherein the light incident portion of the case is closed.

10. An optical information recording/reproducing apparatus according to claim 8, wherein the light incident portion of the case is open.

11. An optical information recording/reproducing apparatus, comprising:
- a disk memory including a disk having a recording medium layer having concentrically formed track grooves for optically recording, erasing, and/or reproducing information and a transparent disk substrate of at most 3.5 inches in diameter through which said recording medium layer is optically irradiated, a case in which said disk is mounted so as to form a narrow gap between a surface of the disk and an inside surface of the case, for maintaining the disk substantially in parallel therbetween and limiting the disk against rotation fluctuation in the vertical direction, and means for rotatably supporting the disk in the case;
- an optical head having an objective lens arranged on he side of said disk opposite said recording medium layer at a distance from said case so as to be untouched by the transparent disk substrate and the case, and such that the distance between that transparent disk substrate and the objective lens becomes no more than the sum of substantially twice the narrow gap and the thickness of the case plus a predetermined space, for recording, erasing and/or reproducing information into/from the recording medium layer through the transparent disk substrate; and
- rotation means for rotating the disk.

12. An information processor, comprising:
- a disk memory including a disk having a recording medium layer having concentrically formed track grooves for optically recording, erasing, and/or reproducing information and a transparent disk substrate of at most 3.5 inches in diameter through which said recording medium layer is optically irradiated, a case in which said disk is mounted so as to form a narrow gap between a surface of the disk and an inside surface of the case, for maintaining the disk substantially in parallel therbetween and limiting the disk against rotation fluctuation in the vertical direction, and mean for rotatably supporting the disk in the case;
- an optical head having an objective lens arranged on the side of said disk opposite said recording medium layer at a distance from said case so as to be untouched by the transparent disk substrate and the case, and such that the distance between the transparent disk substrate and the objective lens becomes no more than the sum of substantially twice of the narrow gap and the thickness of the case plus a predetermined space, for recording, erasing and/or reproducing information into/from the recording medium layer through the transparent disk substrate;
- rotation means for rotating the disk;
- a drive circuit for controlling the operation of the optical head and the rotation of the rotation means;
- a processor for supplying instructions to the drive circuit;
- input means for inputting information into the processor; and
- output means for outputting information from the processor.

* * * * *